United States Patent
Lavoie et al.

(10) Patent No.: US 9,129,528 B2
(45) Date of Patent: Sep. 8, 2015

(54) TRAILER ACTIVE BACK-UP ASSIST WITH LANE WIDTH HMI

(71) Applicant: Ford Global Technologies, Dearborn, MI (US)

(72) Inventors: Erick Michael Lavoie, Dearborn, MI (US); Douglas Scott Rhode, Farmington Hills, MI (US); Darrel Alan Recker, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 369 days.

(21) Appl. No.: 13/758,969

(22) Filed: Feb. 4, 2013

(65) Prior Publication Data

US 2014/0218522 A1    Aug. 7, 2014

(51) Int. Cl.
| | |
|---|---|
| G06F 19/00 | (2011.01) |
| G08G 1/0962 | (2006.01) |
| G08G 1/16 | (2006.01) |
| G01B 21/02 | (2006.01) |
| B60R 1/00 | (2006.01) |
| H04N 7/18 | (2006.01) |
| B62D 6/00 | (2006.01) |
| B62D 13/06 | (2006.01) |
| B60C 23/00 | (2006.01) |

(52) U.S. Cl.
CPC .............. *G08G 1/0962* (2013.01); *G08G 1/167* (2013.01); *B60C 23/00* (2013.01); *B60R 1/00* (2013.01); *B60R 1/002* (2013.01); *B62D 6/00* (2013.01); *B62D 13/06* (2013.01); *G01B 21/02* (2013.01); *G06F 19/00* (2013.01); *H04N 7/18* (2013.01)

(58) Field of Classification Search
CPC ...... G08G 1/0962; G08G 1/167; G08B 21/00; H04N 7/18; G06F 7/00; B62D 13/06; B62D 6/00; B60D 1/36; G01B 21/02; B60T 8/24
See application file for complete search history.

(56) References Cited

U.S. PATENT DOCUMENTS

| | | |
|---|---|---|
| 3,944,972 A | 3/1976 | Chandler |
| 4,277,804 A | 7/1981 | Robison |

(Continued)

FOREIGN PATENT DOCUMENTS

| | | |
|---|---|---|
| CN | 101833869 A | 9/2009 |
| DE | 3923070 A1 | 1/1991 |

(Continued)

OTHER PUBLICATIONS

Back Driving Assistant for Passer Cars with Trailer (SAE Int'l).

(Continued)

*Primary Examiner* — Behrang Badii
(74) *Attorney, Agent, or Firm* — Angela M. Brunetti; Raymond Coppiellie

(57) ABSTRACT

A vehicle comprises a communication interface for enabling information to be communicated to a and from an occupant of the vehicle and a trailer back-up assist system coupled to the communication interface. The trailer back-up assist system is operable for determining a selected width of a lane within which the vehicle and an attached trailer are to be backed from a current position of the vehicle to reach a targeted location for the attached trailer and for outputting to the occupant of the vehicle via the communication interface information characterizing an ability of the vehicle to be backed within the lane from the current position of the vehicle.

29 Claims, 10 Drawing Sheets

(56) References Cited

U.S. PATENT DOCUMENTS

| | | | |
|---|---|---|---|
| 4,848,499 | A | 7/1989 | Martinet et al. |
| 5,247,442 | A | 9/1993 | Kendall |
| 5,455,557 | A | 10/1995 | Noll et al. |
| 5,461,357 | A | 10/1995 | Yoshioka et al. |
| 5,579,228 | A | 11/1996 | Kimbrough |
| 5,690,347 | A | 11/1997 | Juergens |
| 5,734,336 | A | 3/1998 | Smithkline et al. |
| 6,292,094 | B1 | 9/2001 | Deng et al. |
| 6,411,898 | B2 | 6/2002 | Ishida et al. |
| 6,494,476 | B2 | 12/2002 | Masters et al. |
| 6,668,225 | B2 | 12/2003 | Oh |
| 6,838,979 | B2 | 1/2005 | Deng |
| 6,847,916 | B1 | 1/2005 | Ying |
| 6,854,557 | B1 | 2/2005 | Deng |
| 6,959,970 | B2 | 11/2005 | Tseng |
| 6,970,184 | B2 | 11/2005 | Hirama et al. |
| 7,154,385 | B2 | 12/2006 | Lee et al. |
| 7,225,891 | B2 | 6/2007 | Gehring et al. |
| 7,239,958 | B2 | 7/2007 | Grougan |
| 7,272,481 | B2 | 9/2007 | Einig |
| 7,715,953 | B2 | 5/2010 | Shepard |
| 7,786,849 | B2 | 8/2010 | Buckley |
| 7,798,263 | B2 | 9/2010 | Tandy, Jr. |
| 8,427,288 | B2 * | 4/2013 | Schofield et al. .......... 340/425.5 |
| 2002/0005780 | A1 | 1/2002 | Ehrlich |
| 2004/0215374 | A1 | 10/2004 | Shepard |
| 2005/0000738 | A1 | 1/2005 | Gehring |
| 2005/0206225 | A1 | 9/2005 | Offerle et al. |
| 2005/0209763 | A1 | 9/2005 | Offerle et al. |
| 2006/0103511 | A1 | 5/2006 | Lee |
| 2006/0111820 | A1 | 5/2006 | Goetting |
| 2007/0027581 | A1 | 2/2007 | Bauer et al. |
| 2007/0198190 | A1 | 8/2007 | Bauer et al. |
| 2008/0312792 | A1 | 12/2008 | Dechamp |
| 2009/0005932 | A1 | 1/2009 | Lee |
| 2009/0306854 | A1 | 12/2009 | Dechamp |
| 2010/0198491 | A1 | 8/2010 | Mays |
| 2010/0222964 | A1 | 9/2010 | Dechamp |
| 2011/0001825 | A1 | 1/2011 | Hahn |
| 2011/0063425 | A1 | 3/2011 | Tieman |
| 2011/0129093 | A1 | 6/2011 | Karam et al. |
| 2011/0257860 | A1 | 10/2011 | Getman et al. |
| 2012/0030626 | A1 | 2/2012 | Hopkins et al. |
| 2012/0062744 | A1 * | 3/2012 | Schofield et al. ............ 348/148 |
| 2012/0185131 | A1 | 7/2012 | Headley |
| 2012/0200706 | A1 | 8/2012 | Greenwood et al. |
| 2012/0316732 | A1 | 12/2012 | Auer et al. |
| 2014/0085472 | A1 * | 3/2014 | Lu et al. ........................ 348/148 |

FOREIGN PATENT DOCUMENTS

| | | |
|---|---|---|
| DE | 3931518 A1 | 4/1991 |
| DE | 9206595 U1 | 8/1992 |
| DE | 19526702 A1 | 2/1997 |
| DE | 10065230 A1 | 7/2002 |
| DE | 10154612 A1 | 5/2003 |
| DE | 102005043467 | 3/2007 |
| DE | 102005043468 | 3/2007 |
| DE | 102006002294 | 7/2007 |
| DE | 102006035021 | 1/2008 |
| DE | 102008004160 B4 | 10/2008 |
| DE | 102007029413 | 1/2009 |
| DE | 102008043675 | 5/2010 |
| DE | 102009007990 | 8/2010 |
| DE | 102009012253 | 9/2010 |
| DE | 102008004158 B4 | 10/2011 |
| DE | 102008004159 B4 | 10/2011 |
| DE | 102010021052 A1 | 11/2011 |
| DE | 102010029184 | 11/2011 |
| EP | 0418653 A1 | 3/1991 |
| EP | 0849144 A2 | 6/1996 |
| EP | 1810913 | 7/2007 |
| EP | 2431225 | 9/2010 |
| EP | 2388180 A2 | 11/2011 |
| FR | 2515379 A1 | 10/1981 |
| FR | 2606717 | 5/1988 |
| FR | 2786456 A1 | 6/2000 |
| GB | 2398049 A | 8/2004 |
| GB | 2398050 A | 8/2004 |
| WO | WO 8503263 A1 | 8/1985 |
| WO | WO 00/44605 A1 | 8/2000 |
| WO | WO 2005005200 A2 | 1/2005 |

OTHER PUBLICATIONS

IEEE—Backing Up a Truck-Trailer with Suboptimal Distance Trajectories.
IEEE—Control of a Robot-Trailer System Using a Single Non-Collacated Sensor.
IEEE—Feedback Control Scheme for Reversing a Truck and Trailer Vehicle.
Experiments in Autonomous Reversing of a Tractor-Trailer System.
Hybrid Control of a Truck and Trailer Vehicle.
Robust Trajectory Tracking for a Reversing Tractor-Trailer System (Draft).
Optionally Unmanned Ground Systems for Any Steering-Wheel Based Vehicle.
IEEE—Control of a Car with a Trailer Using the Delver Assistance System.
IEEE—Effects of Sensor Placement and Errors on Path Following Control.
Heavy Vehicle Object Detection Systems.
A Simple Tractor-Trailer Backing Control Law for Path Following Oct. 18, 2010.
Backing-Up Maneuvers of Autonomous Tractor-Trailer Vehicles Using the Qualitative Theory of Nonlinear Dynamical Systems Jan. 1, 2009.
Neurointerfaces;Applications 2000.
Trajectory Tracking Control of a Car-Trailer System May 1997.
A Robust Stabilization Problem of Fuzzy Control Systems and Its Application to Backing Up Control of a Truck-Trailer May 1994.
Steering Assistance for Backing Up Articulated Vehicles.
An Input-Output Linearization Approach to the Control of an N-Body Articulated Vehicle Sep. 2001.
An investigation of Abs Strategies for Articulated Vehicles 2004.
Development of Configurations for Infrastructure-Friend Five-and Six-Axle Semitrailers 2006.
Steering and Independent Braking Control fro Tractor-Semitrailer Vehicles in Automated Highway Systems Dec. 15, 1995.
Adam J. Simonoff; Remotely Piloted Vehicle Control and Interface System Aug. 1, 1995.
Wireless-Enabled Microphone, Speaker and User Interface for a Vehicle Aug. 26, 2004.
A New Approach in Intelligent Trailer Parking Sep. 12, 2010.
Automated Parking System for a Truck and Trailer.

\* cited by examiner

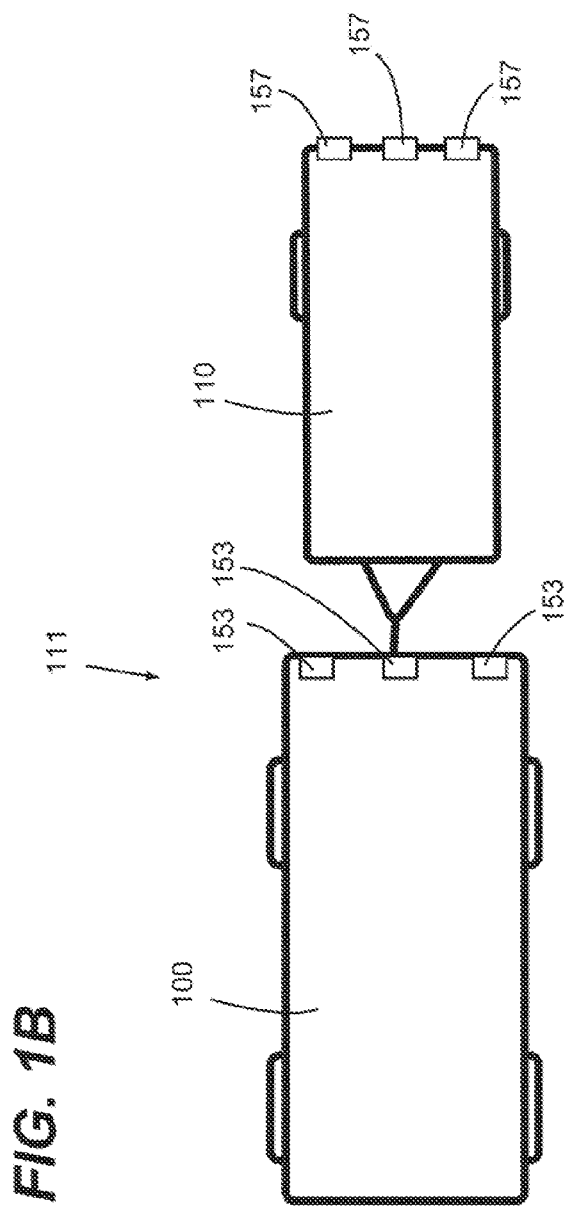

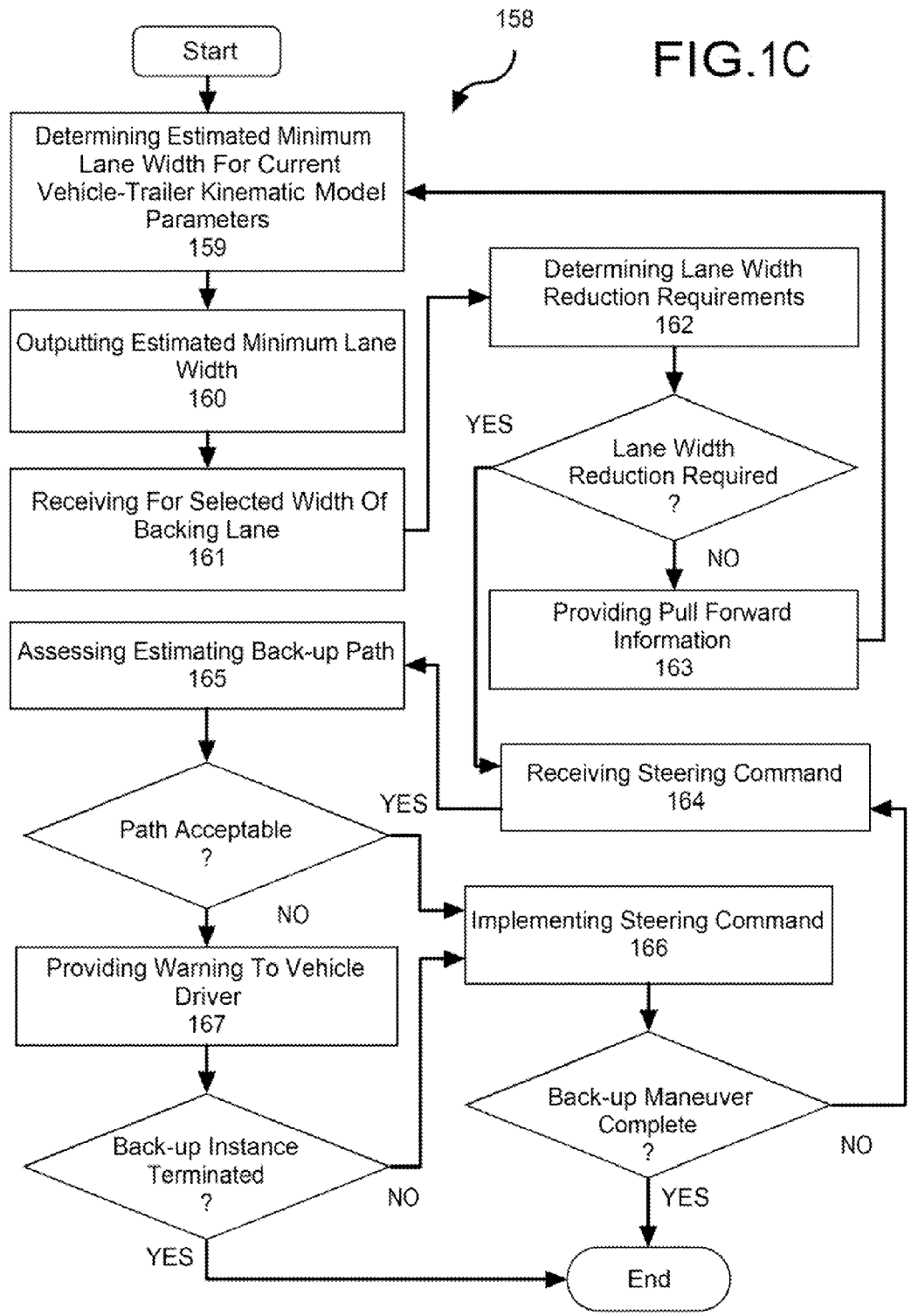

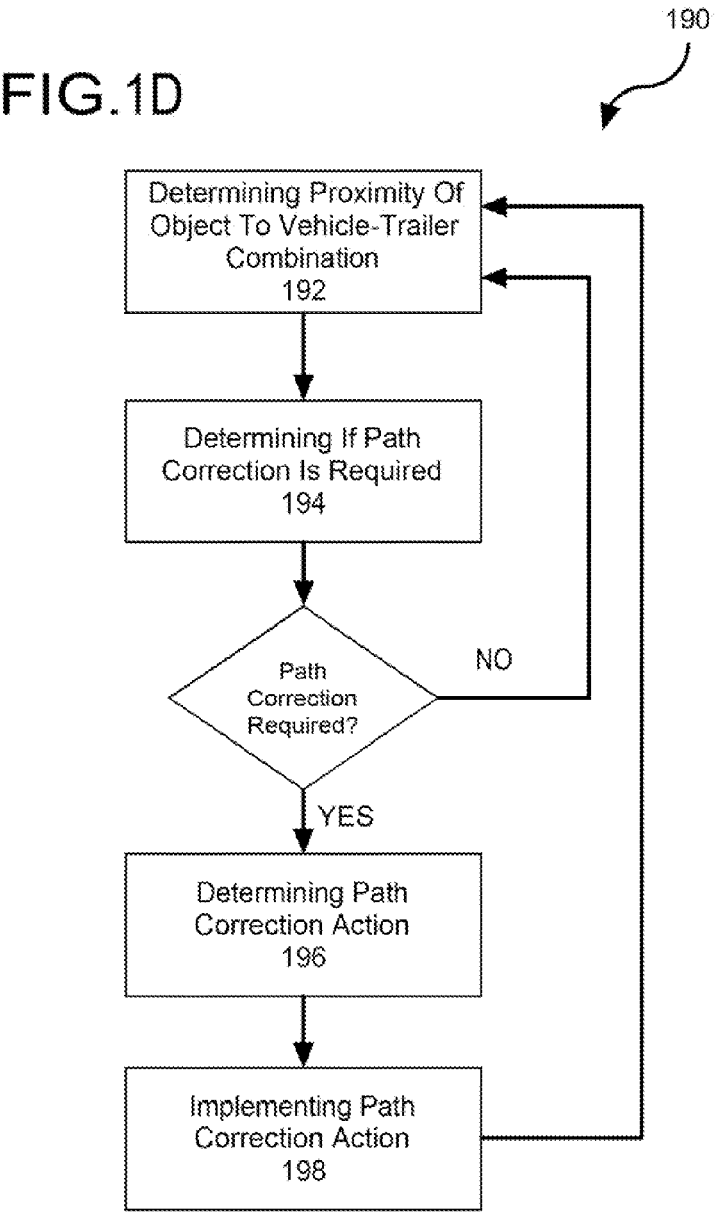

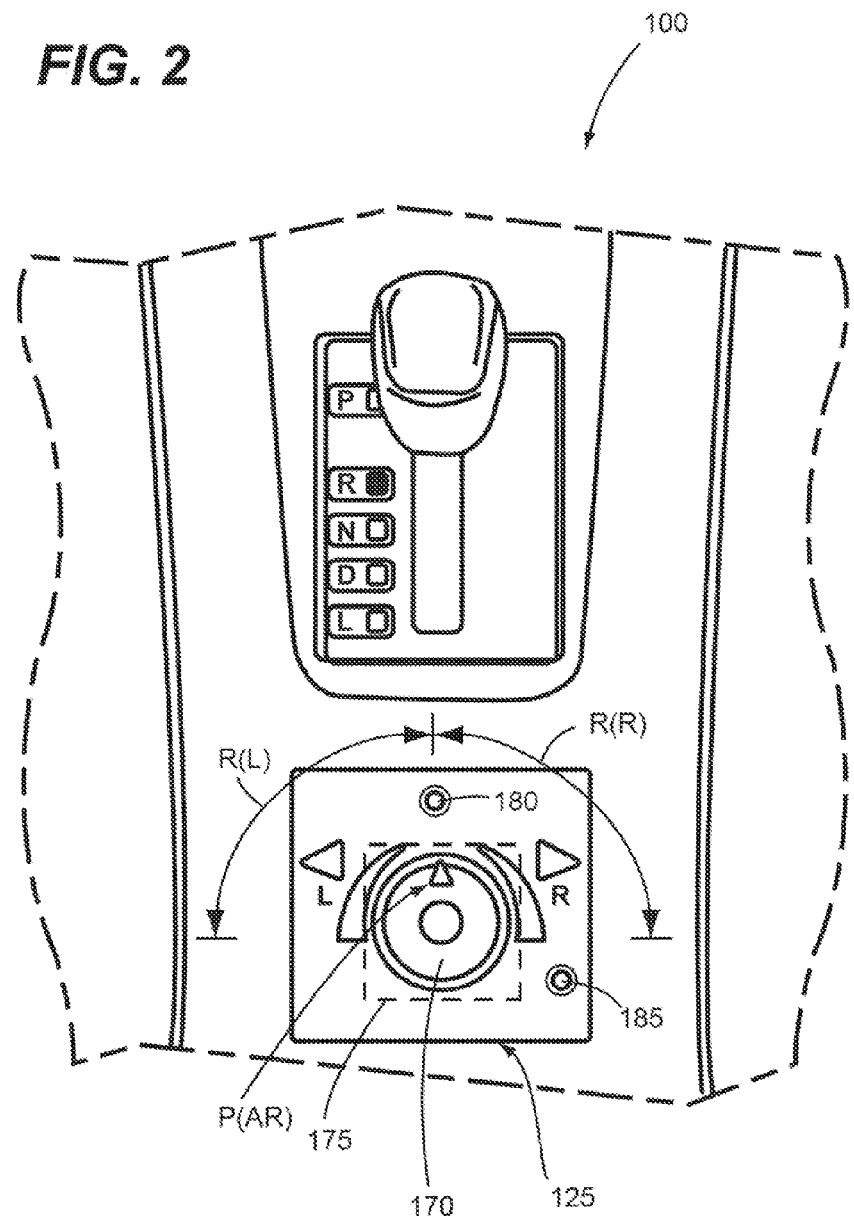

TRAILER ACTIVE BACK-UP ASSIST WITH LANE WIDTH HMI

FIELD OF THE DISCLOSURE

The disclosures made herein relate generally to driver assist and active safety technologies in vehicles and, more particularly, to implementing lane width provisioning integrally with trailer back-up assist.

BACKGROUND

It is well known that backing up a vehicle with a trailer attached is a difficult task for many drivers. This is particularly true for drivers who are untrained at backing with trailers such as, for example, those who drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another reason for such difficulty is that small errors in steering while backing a vehicle with an attached trailer are amplified, thereby causing the trailer to depart from a desired path. Still another reason is that there are often objects and/or structures present that limit available space through which the trailer is to be backed.

To assist the driver in steering a vehicle with trailer attached, a trailer back-up assist system needs to know the driver's intention. One common assumption with known trailer back-up assist systems is that a driver of a vehicle with an attached trailer wants to back up straight and the system either implicitly or explicitly assumes a zero curvature path for the vehicle-trailer combination. Unfortunately, most of real-world use cases of backing a trailer involve a curved path and, thus, assuming a path of zero curvature would significantly limit usefulness of the system. Some known systems assume that a path is known from a map or path planner. To this end, some known trailer back-up assist systems operate under a requirement that a trailer back-up path is known before backing of the trailer commences such as, for example, from a map or a path planning algorithm. Undesirably, such implementations of the trailer back-up assist systems are known to have a relatively complex Human Machine Interface (HMI) to specify the path, obstacles and/or goal of the back-up maneuver. Furthermore, such systems also require some way to determine how well the desired path is being followed and to know when the desired goal, or stopping point and orientation, has been met, using approaches such as cameras, inertial navigation, or high precision GPS. These requirements lead to a relatively complex and costly system.

As previously mentioned, one reason backing a trailer can prove to be difficult is the need to control the vehicle in a manner that limits the potential for a jack-knife condition to occur. A trailer has attained a jack-knife condition when a hitch angle cannot be reduced (i.e., made less acute) by application of a maximum steering input for the vehicle such as, for example, by moving steered front wheels of the vehicle to a maximum steered angle at a maximum rate of steering angle change. In the case of the jack-knife angle being achieved, the vehicle must be pulled forward to relieve the hitch angle in order to eliminate the jack-knife condition and, thus, allow the hitch angle to be controlled via manipulation of the steered wheels of the vehicle.

However, in addition to the jack-knife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed and/or subjected to a suitably high longitudinal acceleration when the jack-knife condition is achieved, the relative movement of the vehicle with respect to the trailer can lead to contact between the vehicle and trailer thereby damaging the trailer and/or the vehicle.

As also previously mentioned, another reason backing a trailer can prove to be difficult is that there are often objects and/or structures present that limit available space through which the trailer is to be backed. A driver must therefore be concerned with not only backing the trailer to an intended location but also with doing so in a manner whereby neither the vehicle nor the trailer collide with adjacent objects and/or structures. Contributing to this challenge is that the potential for the vehicle and trailer to attain a jack-knife condition limits maneuverability for navigating through such object without hitting them.

In some instances, obstacles define a lane width available for backing of the trailer. Or, a lane width can be entirely or partially defined by a lane marker that is on the surface over which the trailer is being backed (e.g., a marker resting on the surface or paint on the surface). It is common that during a trailer back-up maneuver, the front of the tow vehicle swings wide of the resulting trailer path. Furthermore, at the start of a back-up maneuver, it is typically difficult for the driver to predict this path and, during the back-up maneuver, the driver may not be watching the front of the tow vehicle which can lead to collision as the front of the vehicle is steered.

Therefore, a solution that provisioning of requirements for a vehicle-trailer combination to be backed within the confines of a lane of a defined width would be beneficial, desirable and useful.

SUMMARY OF THE DISCLOSURE

As mentioned above, a reason backing a trailer can prove to be difficult is that there are often objects and/or structures present that limit available space through which the trailer is to be backed. A driver must therefore be concerned with not only backing the trailer to an intended (i.e., targeted) location but also with doing so in a manner whereby neither the vehicle nor the trailer collide with adjacent objects and/or structures or otherwise encroach adjacent spaces to a space in which they are backing. Contributing to this challenge is that the potential for the vehicle and trailer to attain a jack-knife condition limits maneuverability for navigating through such object without hitting them.

Embodiments of the inventive subject matter are directed to assisting a driver with backing a trailer attached to a vehicle (i.e., a vehicle-trailer combination) in a manner whereby the vehicle-trailer combination remains within a lane of a defined width during backing. For example, a width of a lane available for backing the vehicle-trailer combination to an intended targeted location may be limited due to obstacles and/or a lane marker that define a maximum available lane width through which the vehicle-trailer combination can be backed. Failure to keep the vehicle-trailer combination within the lane can result in damage to the vehicle and/or trailer or intrude upon a lane or space of another vehicle-trailer combination. To this end, embodiments of the inventive subject matter provide an intuitive human-machine interface (HMI) to communicate to the driver how much lateral space is needed to reverse a trailer in a lane and to indicate to the driver how far to drive forward to bring the lateral space required into an acceptable range. More specifically, the vehicle will communicate to the driver how much lateral space is required to reverse in the lane and will communicate to the driver how much the driver needs to move forward to reduce the lateral space required to a desirable level. Furthermore, the communication can be interactive such that a driver can request a lane width and the vehicle will instruct the driver to position the vehicle for achieving a desired and/or required lane width. Accordingly, embodiments of the inventive subject matter contribute to trailer back-up assist functionality being implemented in a manner that is relatively simple, effective, and safe.

In one embodiment of the inventive subject matter, a vehicle comprises a communication interface for enabling information to be communicated to and from an occupant of the vehicle and a trailer back-up assist system coupled to the communication interface. The trailer back-up assist system is operable for determining a selected width of a lane within which the vehicle and an attached trailer are to be backed from a current position of the vehicle to reach a targeted location for the attached trailer and for outputting to the occupant of the vehicle via the communication interface information characterizing an ability of the vehicle to be backed within the lane from the current position of the vehicle.

In another embodiment of the inventive subject matter, a method for assisting a driver to back a vehicle-trailer combination comprises a plurality of operations. An operation is performed for determining a selected width of a lane within which the vehicle-trailer combination is to be backed from a current position of the vehicle-trailer combination to reach a targeted location and for outputting to a driver of a vehicle of the vehicle-trailer combination information characterizing an ability of the vehicle to be backed within the lane from the current position of the vehicle-trailer combination. One or more one data processing devices access, from memory coupled to the one or more data processing devices, instructions for causing the one or more data processing devices to carry out such operations.

In another embodiment of the inventive subject matter, an electronic controller system has a set of instructions tangibly embodied on a non-transitory processor-readable medium thereof. The set of instructions is accessible from the non-transitory processor-readable medium by one or more data processing devices of the electronic controller system for being interpreted thereby. The set of instructions is configured for causing the one or more one data processing devices to carry out a plurality of operations. An operation is performed for determining a selected width of a lane within which the vehicle-trailer combination is to be backed from a current position of the vehicle-trailer combination to reach a targeted location and for outputting to a driver of a vehicle of the vehicle-trailer combination information characterizing an ability of the vehicle to be backed within the lane from the current position of the vehicle-trailer combination.

These and other objects, embodiments, advantages and/or distinctions of the inventive subject matter will become readily apparent upon further review of the following specification, associated drawings and appended claims.

BRIEF DESCRIPTION OF THE DRAWINGS

FIG. 1B is a diagrammatic view showing a vehicle-trailer combination configured in accordance with an embodiment of the inventive subject matter.

FIG. 1C is a flow diagram showing a method for providing the trailer back-up assist functionality with back-up lane provisioning.

FIG. 1D is a flow diagram showing a method for providing the trailer back-up assist functionality with object avoidance.

FIG. 2 is a diagrammatic view showing a preferred embodiment of the trailer back-up steering input apparatus discussed in reference to FIG. 1A.

DETAILED DESCRIPTION OF THE DRAWING FIGURES

Figure 1A:
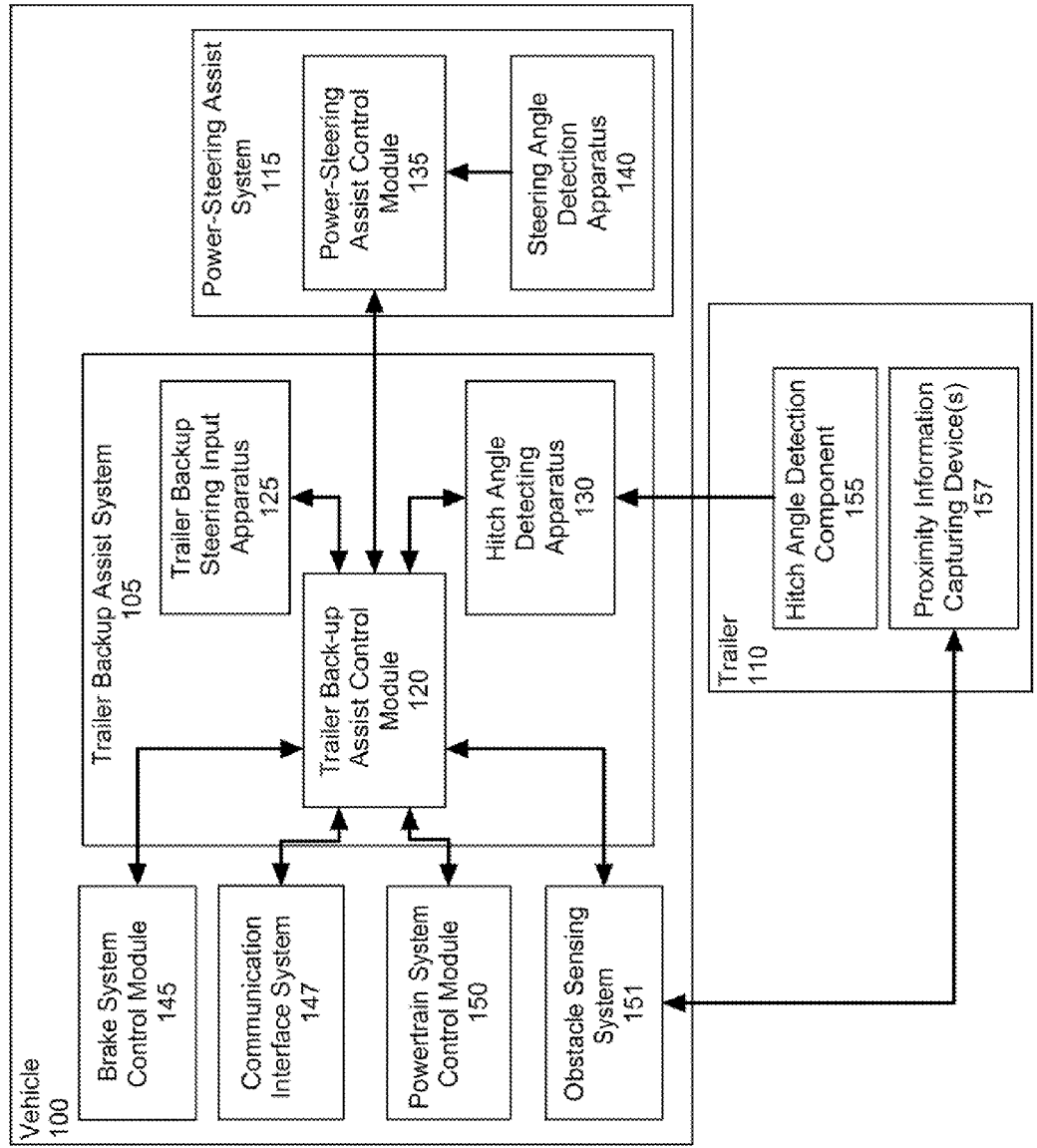
FIG. 1A is a block diagram showing a vehicle configured for performing trailer back-up assist functionality in accordance with an embodiment of the inventive subject matter.

Embodiments of the inventive subject matter are directed to providing trailer back-up assist functionality that includes lane width provisioning. Lane width provisioning refers to an ability to define or otherwise utilize a width of a lane within which a vehicle with an attached trailer is to be backed (i.e., the backing lane). When backing the vehicle-trailer combination in a lane to a given endpoint, the lateral space required is a function of the trailer angle. The driver can reduce the amount of lateral space required to reach the endpoint by driving the vehicle forward in order to reduce the trailer angle.

It is disclosed herein that embodiments of the inventive subject matter can use the proximity of an obstacle to alter the path of the vehicle-trailer combination to avoid colliding with the obstacle. For example, one or both boundaries of the lane within which the vehicle-trailer combination is being backed can be entirely or partially defined by obstacles that the vehicle-trailer combination can collide with. In this regard, obstacles sensed by an obstacle sensing system of the vehicle can be used in determining a width of the lane within which the vehicle-trailer combination is to be backed.

It is well known that there are a variety of sensor technologies and systems used on current vehicles to detect the presence of and/or distance to object adjacent to the vehicle, also known as spatial imaging systems. For example, ultrasonic sensors and/or cameras are used in Active Park Assist to detect curbs, walls, and vehicles and radar is used to warn drivers of objects in and around blind spots of the vehicle. Camera, ultrasonic sensors, and radar are examples of devices configured for capturing information characterizing proximity of an object (i.e., proximity information capturing device). To this end, embodiments of the inventive subject matter can utilize existing proximity information capturing devices on the vehicle and/or use proximity information capturing devices that are on the trailer (e.g., an accessory item mounted on the trailer).

As discussed below in greater detail, in certain embodiments of the inventive subject matter, curvature of a path of travel of the trailer (i.e., trailer path curvature control) can be controlled by allowing a driver of the vehicle to specify a desired path of the trailer by inputting a desired trailer path curvature as the back-up maneuver of the vehicle and trailer progresses. Although a control knob, a set of virtual buttons, or a touch screen can each be implemented for enabling trailer path curvature control, the inventive subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematical information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the vehicle (e.g., electric power assisted steering (EPAS) system) of the vehicle for implementing steering angle changes of steered wheels of the vehicle to achieve (e.g., to approximate) the specified path of travel of the trailer. Furthermore, as will be discussed below, trailer back-up assist functionality in accordance with the inventive subject matter can include one or more countermeasures being implemented for limiting the potential of a jack-knife condition being attained between a vehicle and a trailer being towed by the vehicle.

Referring to FIG. 1A, an embodiment of a vehicle 100 configured for performing trailer back-up assist functionality in accordance with the inventive subject matter is shown. A trailer back-up assist system 105 of the vehicle 100 controls the curvature of path of travel of the trailer 110 that is attached to the vehicle 100. Such control is accomplished through interaction of a power assisted steering system 115 of the vehicle 100 and the trailer back-up assist system 105. During operation of the trailer back-up assist system 105 while the vehicle 100 is being reversed, a driver of the vehicle 100 is sometimes limited in the manner in which he/she can make steering inputs via a steering wheel of the vehicle 100. This is because in certain vehicles the trailer back-up assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) of the back-up assist system 105 is used for commanding changes in curvature of a path of the trailer 110 such as a knob, thereby decoupling such commands from being made at the steering wheel of the vehicle 100. However, some vehicles configured to provide trailer back-up assist functionality in accordance with the inventive subject matter will have the capability to selectively decouple steering movement from movement of steerable wheels of the vehicle, thereby allowing the steering wheel to be used for commanding changes in curvature of a path of a trailer during such trailer back-up assist.

The trailer back-up assist system 105 includes a trailer back-up assist control module 120, a trailer back-up input apparatus 125, and a hitch angle detecting apparatus 130. The trailer back-up assist control module 120 is connected to the trailer back-up input apparatus 125 and the hitch angle detecting apparatus 130 for allowing communication of information there between. It is disclosed herein that the trailer back-up steering input apparatus can be coupled to the trailer back-up assist control module 120 in a wired or wireless manner. The trailer back-up assist system control module 120 is attached to a power-steering assist control module 135 of the power-steering assist system 115 for allowing information to be communicated therebetween. A steering angle detecting apparatus 140 of the power-steering assist system 115 is connected to the power assist control module 125 for providing information thereto. The trailer back-up assist system 105 is also attached to a brake system control module 145, a communication interface system 147, a powertrain control module 150, and an object detection module 151 for allowing communication of information therebetween. Jointly, the trailer back-up assist system 105, the power-steering assist system 115, the brake system control module 145, the powertrain control module 150 define a trailer back-up assist architecture configured in accordance with an embodiment of the inventive subject matter.

The trailer back-up assist control module 120 is configured for implementing logic (i.e., instructions) for receiving information from the trailer back-up input apparatus 125, the hitch angle detecting apparatus 130, the power-steering assist control module 135, the brake system control module 145, and the powertrain control module 150. The trailer back-up assist control module 120 (e.g., a trailer curvature algorithm thereof) generates vehicle information as a function of all or a portion of the information received from the trailer back-up input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist system 115 to achieve a commanded path of travel for the trailer 110.

The trailer back-up input apparatus 125 provides the trailer back-up assist control module 120 with information defining the commanded path of travel of the trailer 110 to the trailer back-up assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer back-up input apparatus 125 preferably includes a rotational control input device for allowing a driver of the vehicle 100 to interface with the trailer back-up input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power-steering assist system configuration that allows a steering wheel to be decoupled from movement of the steered wheels of such a vehicle. Accordingly, the steering wheel can be rotated independent of the manner in which the power-steering assist system of the vehicle controls the steered wheels (e.g., as commanded by vehicle steering information provided by to a power-steering assist system control module from a trailer back-up assist system control module configured in accordance with an embodiment of the inventive subject matter). As such, in these types of vehicles where the steering wheel can be selectively decoupled from the steered wheels to allow independent operation thereof, trailer steering information of a trailer back-up assist system configured in accordance with the inventive subject matter can be provided through rotation of the steering wheel. Accordingly, it is disclosed herein that in certain embodiments of the inventive subject matter, the steering wheel is an embodiment of a rotational control input device in the context of the inventive subject matter. In such embodiments, the steering wheel would be biased (e.g., by an apparatus that is selectively engagable/activatable) to an at-rest position between opposing rotational ranges of motion.

The hitch angle detecting apparatus 130, which operates in conjunction with a hitch angle detection component 155 of the trailer 110, provides the trailer back-up assist control module 120 with information relating to an angle between the vehicle 100 and the trailer 110 (i.e., hitch angle information). In a preferred embodiment, the hitch angle detecting apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detecting apparatus 130). Alternatively, the hitch angle detecting apparatus 130 can be a device that is physically mounted on a hitch component of the vehicle 100 and/or a mating hitch component of the trailer 110 for determining an angle between centerline longitudinal axes of the vehicle 100 and the trailer 110. The hitch angle detecting apparatus 130 can be configured for detecting a jack-knife enabling condition and/or related information (e.g., when a hitch angle threshold has been met).

The power-steering assist control module 135 provides the trailer back-up assist control module 120 with information relating to a rotational position (e.g., angle) of the steering wheel angle and/or a rotational position (e.g., turning angle (s)) of steered wheels of the vehicle 100. In certain embodiments of the inventive subject matter, the trailer back-up assist control module 120 can be an integrated component of the power steering assist system 115. For example, the power-steering assist control module 135 can include a trailer back-up assist algorithm for generating vehicle steering information as a function of all or a portion of information received from the trailer back-up input apparatus 125, the hitch angle detecting apparatus 130, the power-steering assist control module 135, the brake system control module 145, and the powertrain control module 150.

The brake system control module 145 provides the trailer back-up assist control module 120 with information relating to vehicle speed. Such vehicle speed information can be determined from individual wheel speeds as monitored by the brake system control module 145. In some instances, individual wheel speeds can also be used to determine a vehicle yaw angle and/or yaw angle rate and such yaw angle and/or yaw angle rate can be provided to the trailer back-up assist control module 120 for use in determining the vehicle steering information. In certain embodiments, the trailer back-up assist control module 120 can provide vehicle braking information to the brake system control module 145 for allowing the trailer back-up assist control module 120 to control braking of the vehicle 100 during backing of the trailer 110. For example, using the trailer back-up assist control module 120 to regulate speed of the vehicle 100 during backing of the trailer 110 can reduce the potential for unacceptable trailer back-up conditions. Examples of unacceptable trailer back-up conditions include, but are not limited to, a vehicle overspeed condition, trailer angle dynamic instability, a trailer jack-knife condition as defined by an angular displacement limit relative to the vehicle 100 and the trailer 110, and the like. It is disclosed herein that the back-up assist control module 120 can issue a signal corresponding to a notification (e.g., a warning) of an actual, impending, and/or anticipated unacceptable trailer back-up condition.

The communication interface system 147 enables information required for implementing lane width provisioning to be communicated between the driver of the vehicle 100 and the trailer back-up assist system 105. Embodiments of the inventive subject matter are not unnecessarily limited to any particular implementation of the communication interface system 147. For example, in one implementation, the communication interface system 147 can be a dedicated user interface of the vehicle 100. In another implementation, the communication interface system 147 can be a wireless communication interface for enabling communication with a standalone device of the driver (e.g., a smart phone or other wireless digital processing device).

The powertrain control module 150 interacts with the trailer back-up assist control module 120 for regulating speed and acceleration of the vehicle 100 during backing of the trailer 110. As mentioned above, regulation of the speed of the vehicle 100 is necessary to limit the potential for unacceptable trailer back-up conditions such as, for example, jack-knifing and trailer angle dynamic instability. Similar to high-speed considerations as they relate to unacceptable trailer back-up conditions, high acceleration can also lead to such unacceptable trailer back-up conditions.

The obstacle sensing system 151 captures, generates, and outputs information characterizing proximity of objects adjacent to the vehicle 100. As shown in FIG. 1B, the obstacle sensing system 151 can include a plurality of proximity information capturing devices 153 that are each mounted on the vehicle 100 of the vehicle-trailer combination 111 (i.e., the vehicle 100 with the trailer 110 attached thereto). Examples of the vehicle-mounted proximity information capturing devices 153 include, but are not limited to one or more ultrasonic sensors, one or more cameras, and one or more radar transceivers. As shown in FIGS. 1A and 1B, the trailer 110 can also include one or more trailer-mounted proximity information capturing devices 157 that can be coupled to the obstacle sensing system 151 or optionally to the trailer-back-up assist control module 120. Examples of the trailer-mounted proximity information capturing devices 157 include, but are not limited to one or more ultrasonic sensors, one or more cameras, and one or more radar transceivers. Accordingly, the one or more vehicle-mounted proximity information capturing devices 153 enable proximity of objects approaching a rear portion of the vehicle 100 and a front portion of the trailer 110 to be determined and the one or more trailer-mounted proximity information capturing devices 157 enable proximity of objects approaching a rear portion of the trailer 110 to be determined.

FIG. 1C shows an embodiment of a method 158 for providing trailer back-up assist functionality with lane width provisioning is shown. In one embodiment, the trailer back-up assist system 105 and vehicle-trailer combination 111 that are disclosed and discussed above are configured for carrying out the method 158 for providing trailer back-up assist functionality with object avoidance. The method 158 begins with an operation 159 being performed for determining an estimated minimum lane width for a current kinematic model parameters for the vehicle-trailer combination 111 and thereafter an operation 160 being performed for outputting the estimated minimum lane width. For example, kinematic model parameters such as hitch angle, steering angle, vehicle and trailer lengths, wheelbase lengths and the like can be used for determining the estimated minimum lane width that can be achieved from the current position of the vehicle-trailer combination 111 and current kinematic model parameters.

An operation 161 is performed for receiving a selected width of the lane. Receiving the selected width can include querying the driver of the vehicle 100 (or other occupant of the vehicle 100) for accepting the estimated minimum lane width or entering a user specified lane width. Such querying and corresponding response can be implemented via a suitable human-machine interface. Embodiments of the inventive subject matter are not unnecessarily limited to any particular implementation of a human-machine interface. For example, the human machine interface can be entirely integral with the vehicle or a standalone apparatus that is coupled to the vehicle 100 via the communication interface 147. Furthermore, receiving the selected width of the lane can include assessing information received (e.g., acquired) from the obstacle sensing system 151 of the vehicle 100 that defines all or a portion of one or more boundaries of the lane. For example, information from a camera, ultrasonic sensor and/or radar transceiver can be used for detecting an object and/or lane marking that entirely or partially define a boundary of a lane.

In response to receiving the selected lane width, an operation 162 is performed for determining lane width reduction requirements. For example, the driver of the vehicle 100 can enter a requested lane width that is less than the estimated minimum lane width or the driver can request that the lane width be minimized as a function of current kinematic model parameters of the vehicle trailer combination 111. Such determining of lane width reduction requirements can include assessing kinematic model parameters for determining if a jack-knife condition is imminent or approaching. If it is determined that lane width reduction is required, an operation 163 is performed for providing instructions for pulling the vehicle forward in a manner that created revised kinematic model parameter for the selected width (i.e., the selected width being less that the current attainable lane width), followed by the method 158 continuing at the operation 159.

If lane width reduction is not required, an operation 164 is performed for receiving a steering command associated with back-up maneuvering of the vehicle-trailer combination. As discussed below in greater detail, in certain embodiments of the inventive subject matter, the steering command involved the driver specifying curvature of a path of travel of the trailer (i.e., trailer path curvature control) as opposed to directly controlling a steering angle of the wheels of the vehicle 100 via a steering wheel of the vehicle 100. In response to receiving the steering command, an operation 165 is performed for assessing an estimating path of travel of the vehicle-trailer combination 111 corresponding to the steering command. This assessment can include assessing kinematic model parameters for determining if the estimating path of travel of the vehicle-trailer combination 111 results in a jack-knife condition being imminent or approaching and/or the vehicle-trailer combination 111 encroaching upon one or both boundaries of the lane (e.g., via information from the obstacle sensing system 151). If it is determined that the estimating path of travel of the vehicle-trailer combination 111 is acceptable, an operation 166 is performed for implementing the steering command (e.g., enacting a steering angle change based on a trailer path curvature control command or allowing the current steering angle via the steering wheel to be maintained). If it is determined that the estimating path of travel of the vehicle-trailer combination 111 is not acceptable, an operation 167 is performed for warning the driver of the vehicle accordingly of the unacceptable estimated path of travel of the vehicle-trailer combination 111. Such a warning can include notifying the driver that the there is an approaching object that could collide with the vehicle-trailer combination 111 and/or simply that the current lane is too narrow for enabling the requested steering command to be implemented. Thereafter, the method 158 proceeds with allowing the driver terminate the current back-up instance (e.g., by allowing a new lane width to be specified and/or instructing the driver to pulling the vehicle 100 forward) or the method 158 can proceed with the operation 166 for implementing the steering command and thereafter returning tho the operation 164 for receiving a next instance of a steering command.

Examples of warning the driver of the vehicle of the unacceptable estimated path of travel of the vehicle-trailer combination 111 can include, but are not limited to, a visual warning, an audible warning, and a tactile warning. A visual warning can include a display strategy utilizing a smart device of the driver of the vehicle (e.g., a cell phone or tablet) and/or one or more subsystems in the vehicle (e.g., illuminated steering wheel/knob, illuminated camera display, heads up display, illuminated mirrors text or schematic screen). These visual warnings can include color, intensity, and blink frequencies to provide feedback to the driver that a collision mitigation function is active and/or to help guide the drive to avoid the collision. An audible warning can include audible tones or voice commands for instructing the driver to avoid the collision or inform the driver that an automated collision mitigation function is active. A tactile warning can include a steering wheel torque and/or vibration (i.e., haptic feedback) for helping the driver avoid the collision or inform the driver that an automated collision mitigation function is active. Other subsystems or devices such as phones, tablets, vibrating seats may also be used. Changing frequencies of the vibration can be used to convey additional information about the probability of the collision to the drive. Communication between the driver and vehicle can be implemented using various modes of communication such as, for example, vehicle audio system, park aid speakers, text display, navigation system, reverse camera system, massaging seats activation, joystick input, steering wheel input, mirror display, mobile phone, mobile computing device and/or mobile gaming device.

FIG. 1D shows an embodiment of a method 190 for providing trailer back-up assist functionality with object avoidance is shown. In one embodiment, the trailer back-up assist system 105 and vehicle-trailer combination 111 that are disclosed and discussed above are configured for carrying out the method 190 for providing trailer back-up assist functionality with object avoidance. The method 190 begins with an operation 192 being performed for determining proximity of an object adjacent to the vehicle-trailer combination 111. For example, during backing of the vehicle-trailer combination 111, information transmitted from proximity information capturing devices mounted on the vehicle 100 and/or trailer 110 to the trailer back-up assist system 105 is used for determining proximity of the vehicle 100 and/or trailer 110 to an adjacent object.

After determining proximity of the object, an operation 194 is performed for determining if a path of the vehicle-trailer combination needs to be altered (i.e. a vehicle-trailer path correction) for limiting a potential of the vehicle-trailer combination colliding with the object. Determination on the vehicle-trailer path correction is based on proximity of the vehicle-trailer combination 111 to the obstacle. Determination on the vehicle-trailer path correction can also be based on one or more other systems of the vehicle 100 assessing a threshold indicating that the vehicle-trailer combination 111 is approaching a collision condition with respect to the object (i.e., a collision threshold). Examples of the manner in which these other systems can be used for determining if the vehicle-trailer path correction is required include, but are not limited to, engine torque request dynamic transient behavior and magnitudes being used to assess the collision threshold, longitudinal acceleration being used to assess the collision threshold, steering wheel angle rates and dynamic transient behavior being used in predefined or calculated mappings to assess the collision threshold, drive input trailer curvature command transient behavior can be used in a predefined or calculated mappings using current hitch angle position to assess the collision threshold, and hitch angle rate being be used in a predefined or calculated mapping to assess the collision threshold. These other systems can be associated with one or more of the following functional mechanisms of the vehicle: electric power steering, active front steer, four wheel steer, automatic braking, throttle control, and automatic gear selection.

If it is determined that a vehicle-trailer path correction is not required, the method 100 continues to the operation 192 for determining proximity of an object adjacent to the vehicle-trailer combination 111 (e.g., the same and/or different object). If it is determined that a vehicle-trailer path correction is required, an operation 196 is performed for determining a suitable and appropriate action for correcting the path of the trailer-vehicle combination (i.e., path correction action) to mitigate the potential for collision with the object and thereafter an operation 198 is performed for implementing the path correction action. The path correction action can be implemented by guiding the driver entirely through a Human Machine Interface (HMI) and/or automatically controlling the vehicle using a variety of electromechanical systems thereof (e.g., systems associated with electric power steering, active front steer, four wheel steer, automatic braking, throttle control, and automatic gear selection).

Determination of the path correction action can be made on any number of bases. For example, prioritisation can be given to object avoidance mode that has the highest probability of mitigating a collision and/or lowest influence on operation of the vehicle. Examples of object avoidance strategies for implementing the path correction action include, but are not limited to, speed control strategy, steering control strategy, and trailer curvature control strategy. A speed control strategy can include a combination of throttle deactivation or limiting and automatic friction or transmission braking may be used to reduce the speed of the vehicle to reduce collision probability when prescribed collision avoidance criteria (e.g., a respective collision avoidance threshold) corresponding to avoiding collision with the object have been satisfied. A steering control strategy can include steering rates, steering angles limits, relative road wheel angles and speeds and transitional control inputs being reduced or limited in order to satisfy to prescribed collision avoidance criteria corresponding to avoiding collision with the object. A trailer curvature control strategy can include a trailer curvature control target (i.e., commanded value) being reduced in the trailer back-up assist system utilizing, for example, automated steering or HMI guidance, based on mappings using vehicle speed, acceleration, steering rate and/or transitional steering wheel angle behavior to reduce the potential for collision with the object. Accordingly, implementing the path correction action can include issuing a path correction action command for causing one or more object avoidance strategies to be initiated.

In combination with or as a component of determining that the path correction action is required and/or implementing the path correction action, a warning communication can be initiated. Examples of such warning communications include, but are not limited to, a visual warning, an audible warning, and a tactile warning. A visual warning can include a display strategy utilizing a smart device of the driver of the vehicle (e.g., a cell phone or tablet) and/or one or more subsystems in the vehicle (e.g., illuminated steering wheel/knob, illuminated camera display, heads up display, illuminated mirrors text or schematic screen). These visual warnings can include color, intensity, and blink frequencies to provide feedback to the driver that a collision mitigation function is active and/or to help guide the drive to avoid the collision. An audible warning can include audible tones or voice commands for instructing the driver to avoid the collision or inform the driver that an automated collision mitigation function is active. A tactile warning can include a steering wheel torque and/or vibration (i.e., haptic feedback) for helping the driver avoid the collision or inform the driver that an automated collision mitigation function is active. Other subsystems or devices such as phones, tablets, vibrating seats may also be used. Changing frequencies of the vibration can be used to convey additional information about the probability of the collision to the driver. Communication between the driver and vehicle can be implemented using various modes of communication such as, for example, vehicle audio system, park aid speakers, text display, navigation system, reverse camera system, massaging seats activation, joystick input, steering wheel input, mirror display, mobile phone, mobile computing device and/or mobile gaming device.

Referring now to FIG. 2, a preferred embodiment of the trailer back-up input apparatus 125 discussed in reference to FIG. 1A is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer back-up input apparatus 125 shown in FIG. 1A. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 100 is backed along a substantially straight path as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each corresponds to a respective movement sensing device signal indicating a tightest radius of curvature (i.e., most acute trajectory) of a path of travel of the trailer 110 that is possible without the corresponding vehicle steering information causing a jack-knife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion R(L), R(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to dictate a curvature of a path of the trailer 110 to follow and returns the knob 170 to the at-rest position P(AR) for causing the trailer 110 to be backed along a straight line. Accordingly, in embodiments of trailer back-up assist systems where the steering wheel remains physically coupled to the steerable wheels of a vehicle during back-up of an attached trailer, a rotatable control element configured in accordance with the inventive subject matter (e.g., the knob 170) provides a simple and user-friendly means of allowing a driver of a vehicle to input trailer steering commands.

It is disclosed herein that a rotational control input device configured in accordance with embodiments of the inventive subject matter (e.g. the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is approaching the zero curvature commanding position, and the like.

It is also disclosed herein that embodiments of the inventive subject matter can be configured with a control input device that is not rotational (i.e., a non-rotational control input device). Similar to a rotational control input device configured in accordance with embodiments of the inventive subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, and the like.

The trailer back-up input apparatus 125 can be configured to provide various feedback information to a driver of the vehicle 100. Examples of situation that such feedback information can indicate include, but are not limited to, a status of the trailer back-up assist system 105 (e.g., active, in standby (e.g., when driving forward to reduce the trailer angle), faulted, inactive, etc), that a curvature limit has been reached (i.e., maximum commanded curvature of a path of travel of the trailer 110), etc. To this end, the trailer back-up input apparatus 125 can be configured to provide a tactile feedback signal (e.g., a vibration through the knob 170) as a warning if any one of a variety of conditions occur. Examples of such conditions include, but are not limited to, the trailer 110 having jack-knifed, the trailer back-up assist system 105 has had a failure, the trailer back-up assist system 105 or other system of the vehicle 100 has predicted a collision on the present path of travel of the trailer 110, the trailer back-up system 105 has restricted a commanded curvature of a trailer's path of travel (e.g. due to excessive speed or acceleration of the vehicle 100), and the like. Still further, it is disclosed that the trailer back-up input apparatus 125 can use illumination (e.g., an LED 180) and/or an audible signal output (e.g., an audible output device 185) to provide certain feedback information (e.g., notification/warning of an unacceptable trailer back-up condition).

Figure 3:
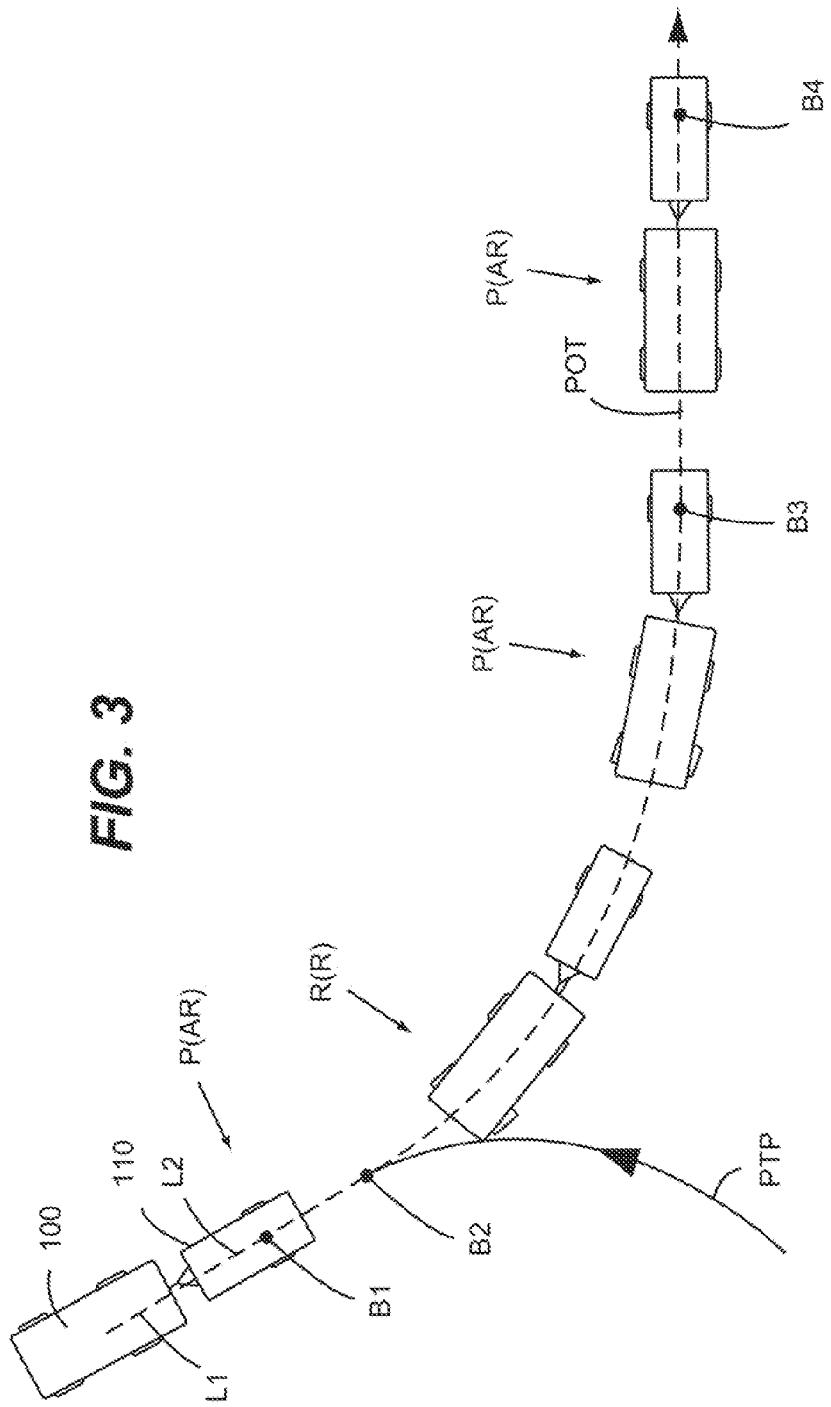
FIG. 3 is a diagrammatic view showing an example of a trailer back-up sequence implemented using the trailer back-up steering input apparatus discussed in reference to FIG. 2.

Referring now to FIGS. 2 and 3, an example of using the trailer back-up input apparatus 125 for dictating a curvature of a path of travel (POT) of a trailer (i.e., the trailer 110 shown in FIG. 1A and FIG. 1B) while backing up the trailer with a vehicle (i.e., the vehicle 100 in FIGS. 1A, 1B and 2) is shown. In preparation of backing the trailer 110, the driver of the vehicle 100 drives the vehicle 100 forward along a pull-thru path (PTP) to position the vehicle 100 and trailer 110 at a first back-up position B1. In the first back-up position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer back-up functionality is not a requirement for operability of a trailer back-up assist system configured in accordance with the inventive subject matter.

After activating the trailer back-up assist system 105 (e.g., before, after, or during the pull-thru sequence), the driver begins to back the trailer 110 by reversing the vehicle 100 from the first back-up position B1. So long as the knob 170 of the trailer back-up input apparatus 125 remains in the at-rest position P(AR), the trailer back-up assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second back-up position 82, the driver rotates the knob 170 to command the trailer 110 to be steered to the right (i.e., a knob position R(R)). Accordingly, the trailer back-up assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches back-up position B3, the driver allows the knob 170 to return to the at-rest position P(AR) thereby causing the trailer back-up assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer back-up assist system 105 steers the vehicle 100 as necessary for causing the trailer 110 to be backed along this substantially straight path to the fourth back-up position B4. In this regard, arcuate (e.g., curved) portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

Figure 4:
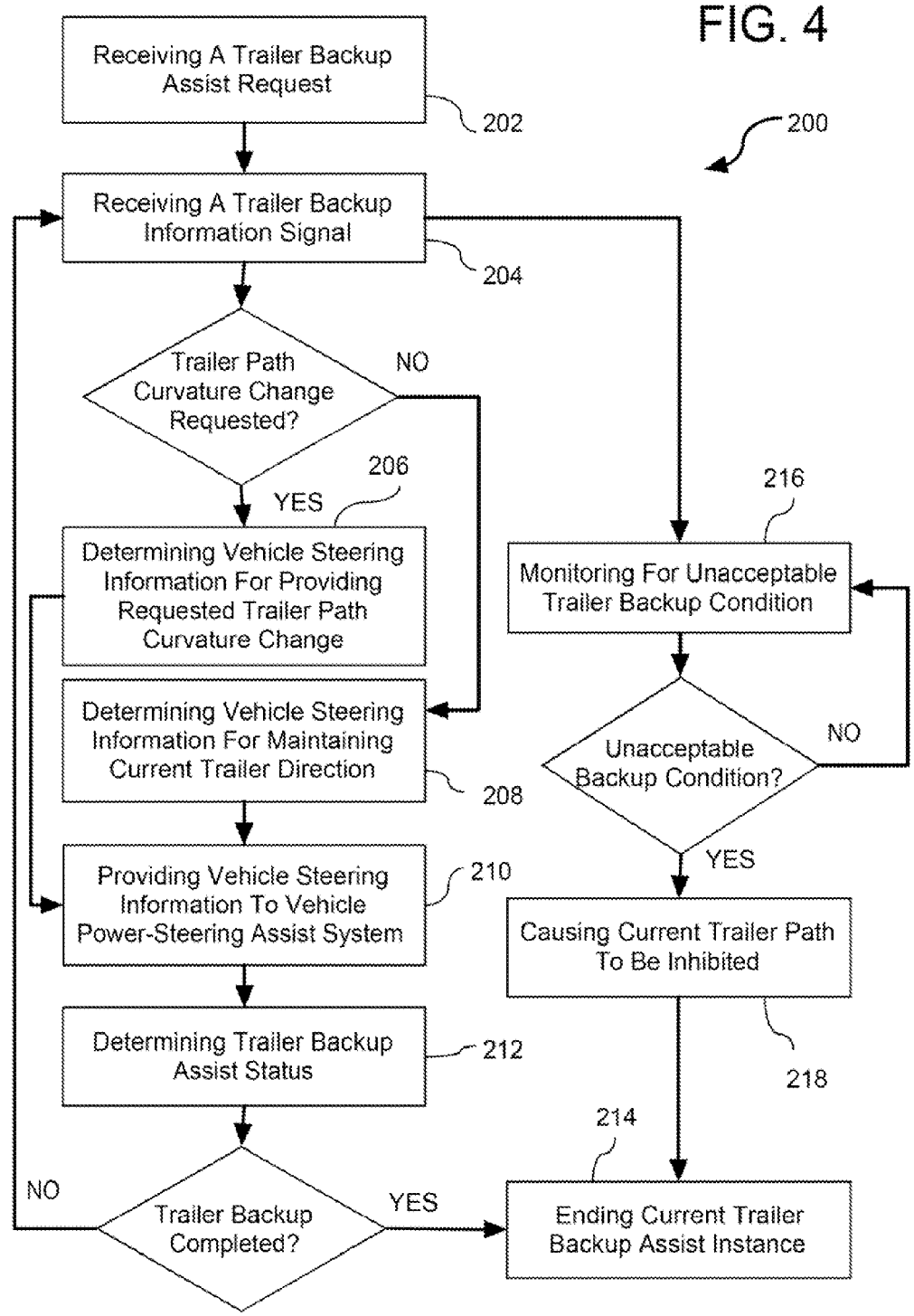
FIG. 4 is a flow diagram showing a method for implementing trailer back-up assist functionality in accordance with an embodiment of the inventive subject matter.

FIG. 4 shows a method 200 for implementing trailer back-up assist functionality in accordance with an embodiment of the inventive subject matter. In a preferred embodiment, the method 200 for implementing trailer back-up assist functionality can be carried out using the trailer back-up assist architecture discussed above in reference to the vehicle 100 and trailer 110 of FIG. 1A. Accordingly, trailer steering information is provided through use of a rotational control input device (e.g., the knob 170 discussed in reference to FIG. 2).

An operation 202 is performed for receiving a trailer back-up assist request. Examples of receiving the trailer back-up assist request include activating the trailer back-up assist system and providing confirmation that the vehicle and trailer are ready to be backed. After receiving a trailer back-up assist request (i.e., while the vehicle is being reversed), an operation 204 is performed for receiving a trailer back-up information signal. Examples of information carried by the trailer back-up information signal include, but is not limited to, information from the trailer back-up input apparatus 125, information from the hitch angle detecting apparatus 130, information from the power-steering assist control module 135, information from the brake system control module 145, and information from the powertrain control module 150. It is disclosed herein that information from the trailer back-up input apparatus 125 preferably includes trailer path curvature information characterizing a desired curvature for the path of travel of the trailer, such as provided by the trailer back-up input apparatus 125 discussed above in reference to FIGS. 1A-D and 2. In this manner, the operation 204 for receiving the trailer back-up information signal can include receiving trailer path curvature information characterizing the desired curvature for the path of travel of the trailer.

If the trailer back-up information signal indicates that a change in curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power-steering assist system of the vehicle, followed by an operation 212 being performed for determining the trailer back-up assist status. If it is determined that trailer back-up is complete, an operation 214 is performed for ending the current trailer back-up assist instance. Otherwise the method 200 returns to the operation 204 for receiving trailer back-up information. Preferably, the operation for receiving the trailer back-up information signal, determining the vehicle steering information, providing the vehicle steering information, and determining the trailer back-up assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer back-up assist instance, the vehicle having to be pulled forward to begin another trailer back-up assist instance, etc), the method 200 will continually be performing the operations for receiving the trailer back-up information signal, determining the vehicle steering information, providing the vehicle steering information, and determining the trailer back-up assist status.

It is disclosed herein that the operation 206 for determining vehicle steering information for providing the requested change in curvature of the trailer's path of travel preferably includes determining vehicle steering information as a function of trailer path curvature information contained within the trailer back-up information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the inventive subject matter.

In some embodiments of the inventive subject matter, the operation 210 for providing the vehicle steering information to the power-steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the steering command can be generated by a controller, module or computer external to the steering system (e.g., a trailer back-up assist control module) and be provided to the steering system.

In parallel with performing the operations for receiving the trailer back-up information signal, determining the vehicle steering information, providing the vehicle steering information, and determining the trailer back-up assist status, the method 200 performs an operation 216 for monitoring the trailer back-up information for determining if an unacceptable trailer back-up condition exists. Examples of such monitoring include, but are not limited to assessing a hitch angle to determine if a hitch angle threshold is exceeded, assessing a back-up speed to determine if a back-up speed threshold is exceeded, assessing vehicle steering angle to determining if a vehicle steering angle threshold is exceeded, assessing other operating parameters (e.g., vehicle longitudinal acceleration, throttle pedal demand rate and hitch angle rate) for determining if a respective threshold value is exceeded, and the like. Back-up speed can be determining from wheel speed information obtained from one or more wheel speed sensors of the vehicle. If it is determined that an unacceptable trailer back-up condition exists, an operation 218 is performed for causing the current path of travel of the trailer to be inhibited (e.g., stopping motion of the vehicle), followed by the operation 214 being performed for ending the current trailer back-up assist instance. It is disclosed herein that prior to and/or in conjunction with causing the current trailer path to be inhibited, one or more actions (e.g., operations) can be implemented for providing the driver with feedback (e.g., a warning) that such an unacceptable trailer angle condition is impending or approaching. In one example, if such feedback results in the unacceptable trailer angle condition being remedied prior to achieving a critical condition, the method can continue with providing trailer back-up assist functionality in accordance with operations 204-212. Otherwise, the method can proceed to operation 214 for ending the current trailer back-up assist instance. In conjunction with performing the operation 214 for ending the current trailer back-up assist instance, an operation can be performed for controlling movement of the vehicle to correct or limit a jack-knife condition (e.g., steering the vehicle, decelerating the vehicle, limiting magnitude and/or rate of driver requested trailer curvature input, and/or the like to preclude the hitch angle from being exceeded).

Turning now to a discussion of a kinematic model used to calculate a relationship between a curvature of a path of travel of a trailer and the steering angle of a vehicle towing the trailer, a low order kinematic model can be desirable for a trailer back-up assist system configured in accordance with some embodiments of the inventive subject matter. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle, vehicle lateral compliance, and the trailer having negligible (e.g., no) deformation, actuator dynamics of the vehicle being negligible, the vehicle and the trailer exhibiting negligible (e.g., no) roll or pitch motions.

Figure 5:
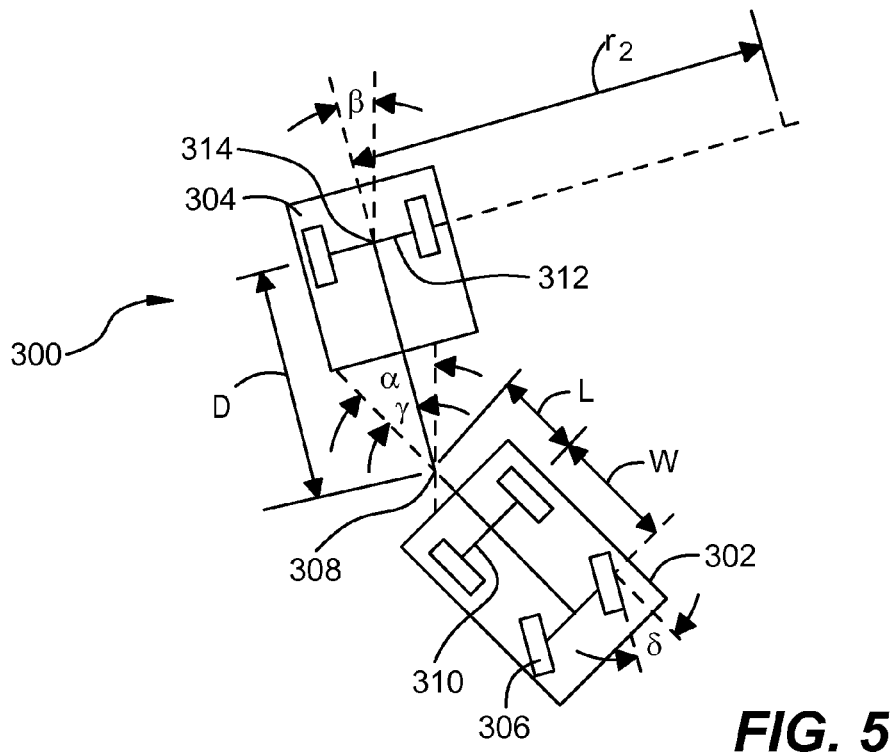
FIG. 5 is a diagrammatic view showing a kinematic model configured for providing information utilized in providing trailer back-up assist functionality in accordance with the inventive subject matter.

As shown in FIG. 5, for a system defined by a vehicle 302 and a trailer 304, the kinematic model 300 is based on various parameters associated with the vehicle 302 and the trailer 304. These kinematic model parameters include:

δ: steering angle at steered front wheels 306 of the vehicle 302;

α: yaw angle of the vehicle 302;

β: yaw angle of the trailer 304,

γ: hitch angle (γ=β−α);

W: wheel base of the vehicle 302;

L: length between hitch point 308 and rear axle 310 of the vehicle 302;

D: length between hitch point 308 and axle 312 of the trailer 304; and $r_2$: curvature radius for the trailer 304.

The kinematic model 300 of FIG. 5 reveals a relationship between trailer path radius of curvature $r_2$ at the midpoint 314 of an axle 306 of the trailer 304, steering angle δ of the steered wheels 306 of the vehicle 302, and the hitch angle γ. As shown in the equation below, this relationship can be expressed to provide the trailer path curvature $\kappa_2$ such that, if γ is given, the trailer path curvature $\kappa_2$ can be controlled based on regulating the steering angle δ (where (β̇(.) is trailer yaw rate and η̇(.) is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma + \tan\delta}{D\left(\left(W + \frac{KV^2}{g}\right)\cos\gamma - L\sin\gamma\tan\delta\right)}$$

Or, this relationship can be expressed to provide the steering angle δ as a function of trailer path curvature κ2 and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa_2$ is determined from the driver input via a trailer back-up steering input apparatus. Through the use of the equation for providing steering angle, a corresponding steering connnand can be generated for controlling a steering system (e.g., an actuator thereof) of the vehicle.

Figure 6:
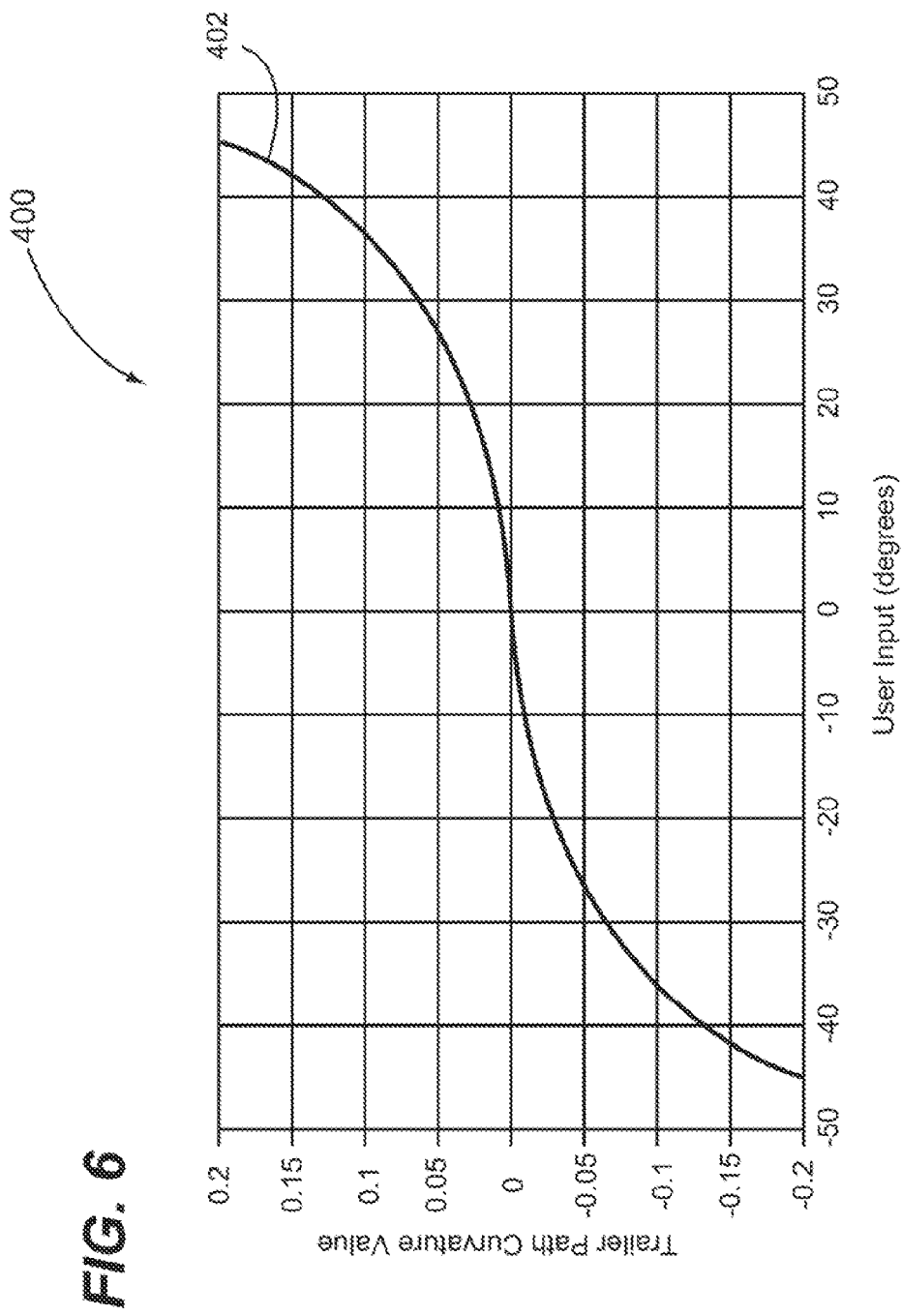
FIG. 6 is a graph showing an example of a trailer path curvature function plot for a rotary-type trailer back-up steering input apparatus configured in accordance with the inventive subject matter.

FIG. 6 shows an example of a trailer path curvature function plot 400 for a rotary-type trailer back-up steering input apparatus (e.g., the trailer back-up input apparatus 125 discussed above in reference to FIGS. 1A-D and 2). A value representing trailer path curvature (e.g., trailer path curvature κ2) is provided as an output signal from the rotary-type trailer back-up steering input apparatus as a function of user input movement. In this example, a curve 402 specifying trailer path curvature relative to user input (e.g., amount of rotation) at a rotary input device (e.g., a knob) is defined by a cubic function. However, a skilled person will appreciate that embodiments of the inventive subject matter are not limited to any particular function between a magnitude and/or rate of input at a trailer back-up steering input apparatus (e.g., knob rotation) and a resulting trailer path curvature value.

Referring to FIG. 5, in preferred embodiments of the inventive subject matter, it is desirable to limit the potential for the vehicle 302 and the trailer 304 to attain a jack-knife angle (i.e., the vehicle/trailer system achieving a jack-knife condition). A jack-knife angle γ(j) refers to a hitch angle γ that cannot be overcome by the maximum steering input for a vehicle, when the vehicle is reversing, such as, for example, the steered front wheels 306 of the vehicle 302 being moved to a maximum steered angle δ at a maximum rate of steering angle change. The jack-knife angle γ(j) is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the axle 312 of the trailer 304. When the hitch angle γ for the vehicle 302 and the trailer 304 achieves or exceeds the jack-knife angle γ(j), the vehicle 302 must be pulled forward to reduce the hitch angle γ. Thus, for limiting the potential for a vehicle/trailer system attaining a jack-knife angle, it is preferable to control the yaw angle of the trailer while keeping the hitch angle of the vehicle/trailer system relatively small.

Figure 7:
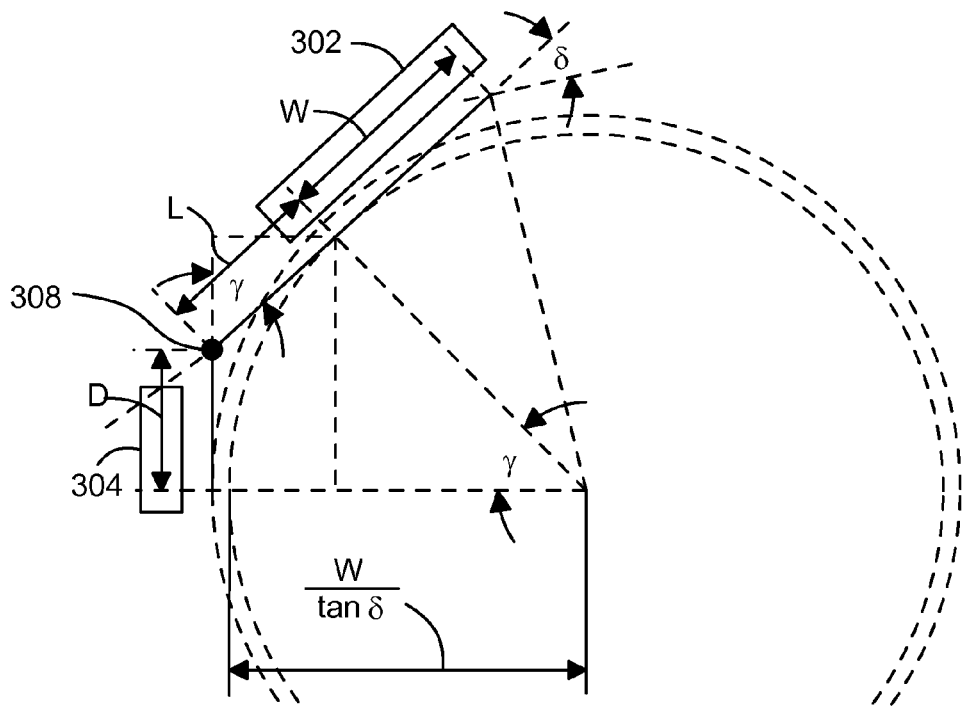
FIG. 7 is a diagrammatic view showing a relationship between hitch angle and steered angle as it relates to determining a jack-knife angle for a vehicle/trailer system.

Referring to FIGS. 5 and 7, a steering angle limit for the steered front wheels 306 requires that the hitch angle γ cannot exceed the jack-knife angle γ(j), which is also referred to as a critical hitch angle. Thus, under the limitation that the hitch angle γ cannot exceed the jack-knife angle γ (j), the jack-knife angle γ(j) is the hitch angle γ that maintains a circular motion for the vehicle/trailer system when the steered wheels 306 are at a maximum steering angle δ(max). The steering angle for circular motion with hitch angle is defined by the following equation.

$$\tan\delta_{max} = \frac{W\sin\gamma_{max}}{D + L\cos\gamma_{max}}$$

Solving the above equation for hitch angle allows jack-knife angle γ(j) to be determined. This solution, which is shown in the following equation, can be used in implementing trailer back-up assist functionality in accordance with the inventive subject matter for monitoring hitch angle in relation to jack-knife angle.

$$\cos\bar{\gamma} = \frac{-b \pm \sqrt{b^2 - 4ac}}{2a},$$

where, $$a = L^2\tan^2\delta(\max) + W^2;$$

$$b = 2LD\tan^2\delta(\max);$$

and $$c = D^2\tan^2\delta(\max) - W^2.$$

In certain instances of backing a trailer, a jack-knife enabling condition can arise based on current operating parameters of a vehicle in combination with a corresponding hitch angle. This condition can be indicated when one or more specified vehicle operating thresholds are met while a particular hitch angle is present. For example, although the particular hitch angle is not currently at the jack-knife angle for the vehicle and attached trailer, certain vehicle operating parameters can lead to a rapid (e.g., uncontrolled) transition of the hitch angle to the jack-knife angle for a current commanded trailer path curvature and/or can reduce an ability to steer the trailer away from the jack-knife angle. One reason for a jack-knife enabling condition is that trailer curvature control mechanisms (e.g., those in accordance with the inventive subject matter) generally calculate steering commands at an instantaneous point in time during backing of a trailer. However, these calculations will typically not account for lag in the steering control system of the vehicle (e.g., lag in a steering EPAS controller). Another reason for the jack-knife enabling condition is that trailer curvature control mechanisms generally exhibit reduced steering sensitivity and/or effectiveness when the vehicle is at relatively high speeds and/or when undergoing relatively high acceleration.

Figure 8:
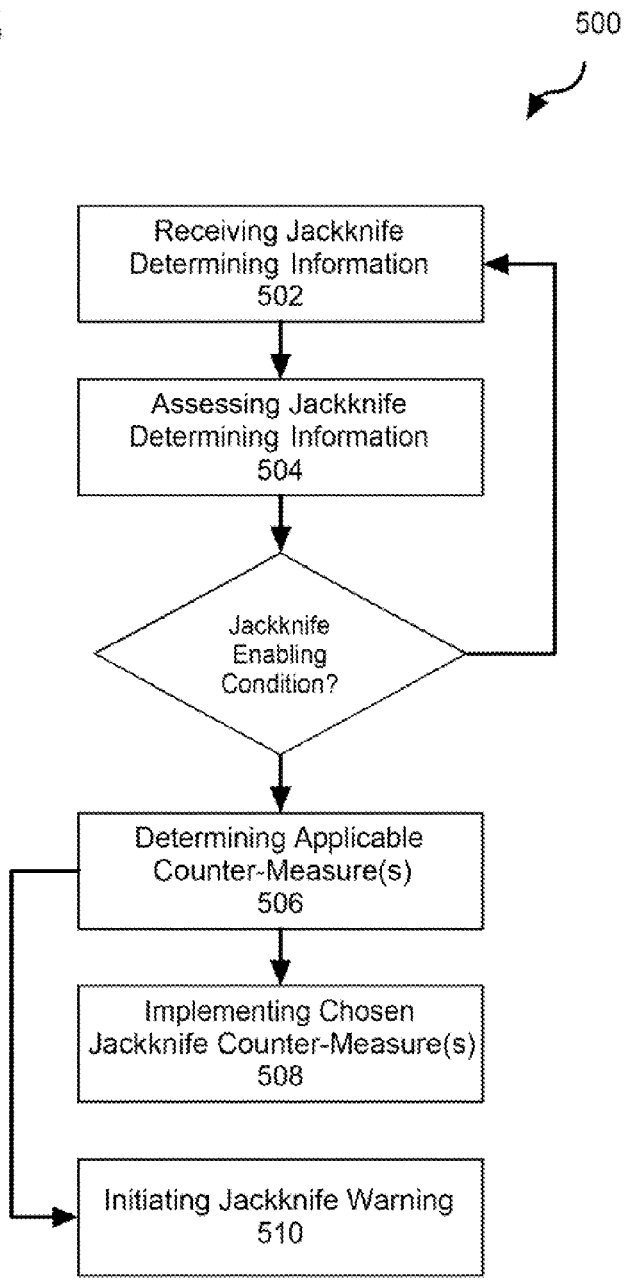
FIG. 8 is a flow diagram showing a method for implementing jack-knife countermeasures functionality in accordance with an embodiment of the inventive subject matter.

FIG. 8 shows a method 500 for implementing jack-knife countermeasures functionality in accordance with an embodiment of the inventive subject matter for a vehicle and attached trailer. Trailer back-up assist functionality in accordance with the inventive subject matter can include jack-knife countermeasures functionality. Alternatively, jack-knife countermeasures functionality in accordance with an embodiment of the inventive subject matter can be implemented separately from other aspects of trailer back-up assist functionality.

The method 500 begins when operation 502 is performed for receiving jack-knife determining information characterizing a jack-knife enabling condition of the vehicle-trailer combination at a particular point in time (e.g., at the point in time when the jack-knife determining information was sampled). Examples of the jack-knife determining information includes, but are not limited to, information characterizing a hitch angle, information characterizing a vehicle accelerator pedal transient state, information characterizing a speed of the vehicle, information characterizing longitudinal acceleration of the vehicle, information characterizing a brake torque being applied by a brake system of the vehicle, information characterizing a powertrain torque being applied to driven wheels of the vehicle, and information characterizing the magnitude and rate of driver requested trailer curvature. The operation 502 for receiving jack-knife determining information can be the first operation in a sampling process where jack-knife determining information is sampled upon initiation of an instance of implementing jack-knife countermeasures functionality. In this regard, jack-knife determining information would be continually monitored such as, for example, by a electronic control unit (ECU) that carries out trailer back-up assist (TBA) functionality. As discussed above in reference to FIG. 5, a kinematic model representation of the vehicle and the trailer can be used to determine a jack-knife angle for the vehicle-trailer combination. However, the inventive subject matter is not unnecessarily limited to any specific approach for determining the jack-knife angle.

After receiving the jack-knife determining information, an operation 504 is performed for assessing the jack-knife determining information for determining if the vehicle-trailer combination attained the jack-knife enabling condition at the particular point in time. The objective of the operation 504 for assessing the jack-knife determining information is determining if a jack-knife enabling condition has been attained at the point in time defined by the jack-knife determining information. If it is determined that a jack-knife enabling condition is not present at the particular point in time, the method 500 returns to the operation 502 for receiving another instance of the jack-knife determining information. If it is determined that a jack-knife enabling condition is present at the particular point in time, an operation 506 is performed for determining an applicable counter-measure or counter-measures to implement. Accordingly, in some embodiments of the inventive subject matter, an applicable counter-measure will be selected dependent upon a parameter identified as being a key influencer of the jack-knife enabling condition. However, in other embodiments, an applicable counter-measure will be selected as being most able to readily alleviate the jack-knife enabling condition. In still other embodiment, a pre-defined counter-measure or pre-defined set of counter-measures may be the applicable counter-measure(s).

The objective of a counter-measure in the context of the inventive subject matter (i.e., a jack-knife reduction counter-measure) is to alleviate a jack-knife enabling condition. To this end, such a counter-measure can be configured to alleviate the jack-knife enabling condition using a variety of different strategies. In a vehicle speed sensitive counter-measure strategy, actions taken for alleviating the jack-knife enabling condition can include overriding and/or limiting driver requested trailer radius of curvature (e.g., being requested via a trailer back-up steering input apparatus configured in accordance with the inventive subject matter) as a function of vehicle speed (e.g., via a look-up table correlating radius of curvature limits to vehicle speed as shown in FIG. 6). In a counter-measure strategy where trailer curvature requests are limited as a function of speed and driver curvature command transient rates, actions taken for alleviating the jack-knife enabling condition can include rate limiting trailer curvature command transients as requested by a driver above a pre-defined vehicle speed whereas, under the pre-defined vehicle speed, the as-requested trailer curvature are not rate limited. In a torque limiting counter-measure strategy, actions taken for alleviating the jack-knife enabling condition can include application of full available powertrain torque being inhibited when the jack-knife enabling condition is present while the vehicle is above a pre-defined speed and application of full available powertrain torque being allowed when the vehicle speed is reduced below the pre-defined speed while in the torque inhibiting mode. As opposed to a fixed pre-defined speed, the torque limiting counter-measure strategy can utilize a speed threshold that is a function of hitch angle (i.e., speed threshold inversely proportional to hitch angle acuteness). In a driver accelerator pedal transient detection counter-measure strategy, actions taken for alleviating the jack-knife enabling condition can include overriding and/or limiting driver requested trailer radius of curvature as a function of transient accelerator pedal requests (e.g., requested trailer radius of curvature limited when a large accelerator pedal transient is detected). In a hitch angle rate sensitive counter-measure strategy, actions taken for alleviating the jack-knife enabling condition can include using hitch angle rate in a predefined or calculated mapping with current hitch angle position to limit driver requested trailer radius of curvature. Accordingly, in view of the disclosures made herein, a skilled person will appreciate that embodiments of the inventive subject matter are not unnecessarily limited to a counter-measure strategy of any particular configuration.

As disclosed above, implementation of trailer back-up assist functionality in accordance with the inventive subject matter can utilize a kinematic model for determining steering control information, jack-knife enabling conditions, and jack-knife angle. Such a kinematic model has many parameters than can influence trailer curvature control effectiveness. Examples of these parameters include, but are not limited to, the vehicle wheelbase, understeer gradient gain, vehicle track width, maximum steer angle at the vehicle front wheels, minimum turning radius of vehicle, maximum steering rate able to be commanded by the steering system, hitch ball to trailer axle length, and vehicle rear axle to hitch ball length. Sensitivity analysis for a given kinematic model can be used to provide an understanding (e.g., sensitivity) of the relationships between such parameters, thereby providing information necessary for improving curvature control performance and for reducing the potential for jack-knife enabling conditions. For example, through an understanding of the sensitivity of the parameters of a kinematic model, scaling factors can be used with speed dependent jack-knife counter-measures to reduce jack-knife potential (e.g., for special applications such as short wheelbase conditions).

Still referring to FIG. 8, after determining the applicable countermeasure(s), an operation 508 is performed for implementing the chosen jack-knife countermeasure(s) and an operation 510 is performed for initiating a jack-knife warning. As discussed above in regard to counter-measure strategies, implementing the jack-knife counter-measure(s) can include commanding a speed controlling system of the vehicle to transition to an altered state of operation in which a speed of the vehicle is reduced, commanding the steering control system of the vehicle to transition to an altered state of operation in which a radius of a curvature of a path of the trailer is increased, command the steering control system of the vehicle to transition to an altered state of operation in which an increase in the radius of the curvature of the path of the trailer is inhibited, commanding a brake control system of the vehicle to apply brake torque to reduce vehicle speed/inhibit vehicle acceleration, and/or commanding a powertrain control system of the vehicle to inhibit full available powertrain torque from being delivered to driven wheels of the vehicle until another jack-knife enabling parameter (e.g. vehicle speed) is below a defined threshold. In certain embodiments of the inventive subject matter, the jack-knife warning is provided to the driver using at least one vehicle control system through which the jack-knife counter-measure is implemented. Speed reduction can be accomplished by any number of means such as, for example, limiting throttle inputs (e.g., via a terrain management feature) and/or transitioning a transmission to a reverse low gear if the vehicle is equipped with a multi-range reverse gear transmission. Examples of such system-specific warning approach include, but are not limited to, providing a warning through an accelerator pedal of the vehicle (e.g., via haptic feedback) if the counter-measure includes limiting speed of the vehicle and/or providing a warning through an input element (e.g., knob) of a trailer back-up steering input apparatus of the vehicle (e.g., via haptic feedback if the counter-measure includes limiting driver requested trailer radius of curvature), through haptic seat vibration warning, through a visual warning (e.g., a through a visual display apparatus of the towing vehicle) and/or through a audible warnings (e.g., through an audio output apparatus of the towing vehicle), or the like. One embodiment of utilizing warnings relating to vehicle speed as it related to onset or presence of a jack-knife enabling condition includes implementation of a dual stage warning. For example, when a backing speed of the vehicle increases sufficiently for causing a speed of the vehicle to reach a lower (i.e., first) speed threshold during backing of the trailer, a driver of the vehicle would be provided with a first warning indication (e.g., via haptic, audible, and/or visual means as implemented by the trailer back-up assist system) for informing the driver that there is the need to reduce the speed of the vehicle to alleviate or prelude the jack-knife enabling condition. If the driver does not correspondingly respond by causing a speed of the vehicle to be reduced (or not to further increase) and the vehicle continues to gain speed such that it passes a higher (i.e., a second) speed threshold, the driver of the vehicle would be provided with a second warning indication (e.g., a more severed haptic, audible, and/or visual means as implemented by the trailer back-up assist system) for informing the driver that there is an immediate need to reduce the speed of the vehicle to alleviate or prelude the jack-knife enabling condition. The first and/or the second speed indication warnings can be implemented in conjunction with a respective speed limiting counter-measure measures (e.g., the trailer back-up assist system causing activation of a brake system of the vehicle and/or deducing a throttle position of the vehicle).

Referring now to instructions processible by a data processing device, it will be understood from the disclosures made herein that methods, processes and/or operations adapted for carrying out trailer back-up assist functionality as disclosed herein are tangibly embodied by non-transitory computer readable medium having instructions thereon that are configured for carrying out such functionality. The instructions are tangibly embodied for carrying out the method 100 and/or the method 200 disclosed and discussed above and can be further configured for limiting the potential for a jack-knife condition such as, for example, by monitoring jack-knife angle through use of the equations discussed in reference to FIGS. 5 and 7 and/or by implementing jack-knife countermeasures functionality discussed above in reference to FIG. 8. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer back-up assist functionality in accordance with the inventive subject matter.

In a preferred embodiment of the inventive subject matter, a trailer back-up assist control module (e.g., the trailer back-up assist control module 120 discussed above in reference to FIG. 1A) comprises such a data processing device, such a non-transitory computer readable medium, and such instructions on the computer readable medium for carrying out trailer back-up assist functionality (e.g., in accordance with the method 200 discussed above in reference to FIG. 2 and/or the method 500 discussed above in reference to FIG. 8). To this end, the trailer back-up assist control module can comprise various signal interfaces for receiving and outputting signals. For example, a jack-knife enabling condition detector can include a device providing hitch angle information and hitch angle calculating logic of the trailer back-up assist control module. A trailer back-up assist control module in the context of the inventive subject matter can be any control module of an electronic control system that provides for trailer back-up assist control functionality in accordance with the inventive subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer back-up assist control module in accordance with the inventive subject matter is implemented within a standalone controller unit that provides only trailer back-up assist functionality. In another example, trailer back-up assist functionality in accordance with the inventive subject matter is implemented within a standalone controller unit of an electronic control system of a vehicle that provides trailer back-up assist functionality as well as one or more other types of system control functionality of a vehicle (e.g., anti-lock brake system functionality, steering power assist functionality, etc). In still another example, trailer back-up assist functionality in accordance with the inventive subject matter is implemented logically in a distributed manner whereby a plurality of control units, control modules, computers, or the like (e.g., an electronic control system) jointly carry out operations for providing such trailer back-up assist functionality.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle, comprising:
a communication interface for enabling information to be communicated to and from an occupant of the vehicle; and
a trailer back-up assist system coupled to the communication interface, wherein the trailer back-up assist system is operable to determine a selected width of a lane within which the vehicle and an attached trailer are to be backed from a current position of the vehicle to reach a targeted location for the attached trailer and to output to an occupant of the vehicle via the communication interface information characterizing an ability of the vehicle to be backed within the lane from the current position of the vehicle.

2. The vehicle of claim 1, further comprising:
a spatial imaging system coupled to the trailer back-up assist system, wherein the trailer back-up assist system is operable to receive lane width determining information from the spatial imaging system.

3. The vehicle of claim 2 wherein the lane width determining information characterizes at least one boundary of the lane.

4. The vehicle of claim 1 wherein the trailer back-up assist system is further operable to output an estimated minimum lane width achievable for a hitch angle between the vehicle and the attached trailer while at the current position of the vehicle and prior to outputting the information characterizing the ability of the vehicle to be backed within the lane of the selected width.

5. The vehicle of claim 1 wherein:
determining the selected width of the lane within which the vehicle and the attached trailer are to be backed includes receiving information characterizing a desired width of the lane; and
outputting the information characterizing the ability of the vehicle to be backed within the lane includes outputting information instructing the driver of the vehicle to pull the vehicle-trailer combination forward to achieve kinematic model parameters for the vehicle-trailer combination that allow backing of the vehicle trailer combination within the lane of the selected width.

6. The vehicle of claim 5 wherein receiving information characterizing a desired width of the lane includes outputting a prompt requesting entry of the desired width of the lane.

7. The vehicle of claim 5 wherein the information instructing the driver of the vehicle to pull the vehicle forward include information characterizing a distance to move the vehicle forward from the current position of the vehicle.

8. The vehicle of claim 7 wherein the trailer back-up assist system is further operable to output an estimated minimum lane width achievable for a hitch angle between the vehicle and the attached trailer while at the current position and prior to outputting the information characterizing the ability of the vehicle to be backed within the lane of the selected width.

9. The vehicle of claim 1 wherein determining the selected width of the lane which the vehicle-trailer combination is to be backed includes acquiring lane width determining information from an obstacle sensing system of the vehicle.

10. The vehicle of claim 9 wherein outputting the information characterizing the ability of the vehicle to be backed within the lane includes outputting information instructing the driver of the vehicle to pull the vehicle forward until a suitable kinematic model parameters for the vehicle and attached trailer is achieved to enable the vehicle and the attached trailer to be backed within the lane of the selected width.

11. The vehicle of claim 10 wherein the information instructing the driver of the vehicle to pull the vehicle forward include information characterizing a distance to move the vehicle forward from the current position of the vehicle.

12. A method for assisting a driver to back a vehicle-trailer combination, comprising:
at least one data processing device accessing, from memory coupled to the at least one data processing device, instructions causing the at least one data processing device to determine a selected width of a lane within which the vehicle-trailer combination is to be backed from a current position of the vehicle-trailer combination to reach a targeted location; and
the at least one data processing device accessing, from the memory, instructions causing the at least one data processing device to output to a driver of a vehicle of the vehicle-trailer combination information characterizing an ability of the vehicle to be backed within the lane from the current position of the vehicle-trailer combination.

13. The method of claim 12 further comprising:
the at least one data processing device accessing, from the memory, instructions causing the at least one data processing device to output an estimated minimum lane width achievable for a hitch angle of the vehicle-trailer combination while at the current position and prior to causing the at least one data processing device to output the information characterizing the ability of the vehicle to be backed within the lane of the selected width.

14. The method of claim 12 wherein:
causing the at least one data processing device to determine the selected width of the lane within which the vehicle-trailer combination is to be backed includes causing the at least one data processing device to receive information characterizing a desired width of the lane; and
causing the at least one data processing device to output the information characterizing the ability of the vehicle to be backed within the lane includes causing the at least one data processing device to output information instructing the driver of the vehicle to pull the vehicle-trailer combination forward to achieve kinematic model parameters for the vehicle-trailer combination that allow backing of the vehicle trailer combination within the lane of the selected width.

15. The method of claim 14 wherein causing the at least one data processing device to receive information characterizing a desired width of the lane includes causing the at least one data processing device to output a prompt requesting entry of the desired width of the lane.

16. The method of claim 14 wherein the information instructing the driver of the vehicle to pull the vehicle forward include information characterizing a distance to move the vehicle-trailer combination forward from the current position of the vehicle-trailer combination.

17. The method of claim 16 further comprising:
the at least one data processing device accessing, from the memory, instructions causing the at least one data processing device to output an estimated minimum lane width achievable for a hitch angle of the vehicle-trailer combination while at the current position and prior to causing the at least one data processing device to output the information characterizing the ability of the vehicle to be backed within the lane of the selected width.

18. The method of claim 12 wherein causing the at least one data processing device to determine the selected width of the lane which the vehicle-trailer combination is to be backed includes causing the at least one data processing device to acquire lane width determining information from an obstacle sensing system of the vehicle.

19. The method of claim 18 wherein causing the at least one data processing device to output the information characterizing the ability of the vehicle to be backed within the lane includes causing the at least one data processing device to output information instructing the driver of the vehicle to pull the vehicle-trailer combination forward until a suitable kinematic model parameters for the vehicle-trailer combination is achieved to enable the vehicle-trailer combination to be backed within the lane of the selected width.

20. The method of claim 19 wherein the information instructing the driver of the vehicle to pull the vehicle forward include information characterizing a distance to move the vehicle-trailer combination forward from the current position of the vehicle-trailer combination.

21. An electronic controller system having a set of instructions tangibly embodied on a non-transitory processor-readable medium thereof, the set of instructions is accessible from the non-transitory processor-readable medium by at least one data processing device of the electronic controller system for being interpreted thereby, and the set of instructions is configured for causing the at least one data processing device to carry out operations for:
determining a selected width of a lane within which the vehicle-trailer combination is to be backed from a current position of the vehicle-trailer combination to reach a targeted location; and
outputting to a driver of a vehicle of the vehicle-trailer combination information characterizing an ability of the vehicle to be backed within the lane from the current position of the vehicle-trailer combination.

22. The electronic controller system of claim 21 wherein the set of instructions is further configured for causing the at least one data processing device to carry out operations for:
outputting an estimated minimum lane width achievable for a hitch angle of the vehicle-trailer combination while at the current position and prior to outputting the information characterizing the ability of the vehicle to be backed within the lane of the selected width.

23. The electronic controller system of claim 21 wherein:
determining the selected width of the lane within which the vehicle-trailer combination is to be backed includes receiving information characterizing a desired width of the lane; and
outputting the information characterizing the ability of the vehicle to be backed within the lane includes outputting information instructing the driver of the vehicle to pull the vehicle-trailer combination forward to achieve kinematic model parameters for the vehicle-trailer combination that allow backing of the vehicle trailer combination within the lane of the selected width.

24. The electronic controller system of claim 23 wherein receiving information characterizing a desired width of the lane includes outputting a prompt requesting entry of the desired width of the lane.

25. The electronic controller system of claim 23 wherein the information instructing the driver of the vehicle to pull the vehicle forward include information characterizing a distance to move the vehicle-trailer combination forward from the current position of the vehicle-trailer combination.

26. The electronic controller system of claim 25 wherein the set of instructions is further configured for causing the at least one data processing device to carry out operations for:

outputting an estimated minimum lane width achievable for a hitch angle of the vehicle-trailer combination while at the current position and prior to outputting the information characterizing the ability of the vehicle to be backed within the lane of the selected width.

27. The electronic controller system of claim 21 wherein determining the selected width of the lane which the vehicle-trailer combination is to be backed includes acquiring lane width determining information from an obstacle sensing system of the vehicle.

28. The electronic controller system of claim 27 wherein outputting the information characterizing the ability of the vehicle to be backed within the lane includes outputting information instructing the driver of the vehicle to pull the vehicle-trailer combination forward until a suitable kinematic model parameters for the vehicle-trailer combination is achieved to enable the vehicle-trailer combination to be backed within the lane of the selected width.

29. The electronic controller system of claim 28 wherein the information instructing the driver of the vehicle to pull the vehicle forward include information characterizing a distance to move the vehicle-trailer combination forward from the current position of the vehicle-trailer combination.

* * * * *